US008842101B2

(12) United States Patent
Minami

(10) Patent No.: US 8,842,101 B2
(45) Date of Patent: Sep. 23, 2014

(54) PANEL, CONTROL METHOD THEREOF, DISPLAY DEVICE AND ELECTRONIC APPARATUS

(75) Inventor: Tetsuo Minami, Tokyo (JP)

(73) Assignee: Sony Corporation, Tokyo (JP)

( * ) Notice: Subject to any disclaimer, the term of this patent is extended or adjusted under 35 U.S.C. 154(b) by 760 days.

(21) Appl. No.: 12/656,843

(22) Filed: Feb. 17, 2010

(65) Prior Publication Data

US 2010/0245318 A1 Sep. 30, 2010

(30) Foreign Application Priority Data

Mar. 31, 2009 (JP) ................................ 2009-084184

(51) Int. Cl.
*G06F 3/038* (2013.01)
*G09G 5/00* (2006.01)
*G09G 3/32* (2006.01)

(52) U.S. Cl.
CPC ...... *G09G 3/3233* (2013.01); *G09G 2300/0852* (2013.01); *G09G 2300/0866* (2013.01); *G09G 2300/0819* (2013.01)
USPC ............................................ 345/204; 345/76

(58) Field of Classification Search
None
See application file for complete search history.

(56) References Cited

U.S. PATENT DOCUMENTS

2003/0227262 A1 12/2003 Kwon
2004/0046164 A1 3/2004 Kobayashi et al.
2004/0070557 A1 4/2004 Asano et al.
2005/0206590 A1 9/2005 Sasaki et al.
2006/0187153 A1* 8/2006 Nathan et al. ................... 345/76
2007/0247398 A1* 10/2007 Nathan et al. ................... 345/82
2008/0042948 A1* 2/2008 Yamashita et al. .............. 345/82
2008/0084365 A1* 4/2008 Takahara et al. ................ 345/76
2008/0224964 A1* 9/2008 Tanikame et al. ............... 345/76
2008/0252626 A1* 10/2008 Iida et al. ...................... 345/204
2009/0122047 A1* 5/2009 Yamamoto et al. ........... 345/211
2009/0278771 A1* 11/2009 Yamamoto et al. ............. 345/76
2009/0295785 A1* 12/2009 Yamamoto et al. ........... 345/214
2010/0214276 A1* 8/2010 Tanikame et al. ............. 345/211

FOREIGN PATENT DOCUMENTS

JP 2003-255856 A 9/2003
JP 2003-271095 9/2003
JP 2004-029791 A 1/2004
JP 2004-093682 A 3/2004
JP 2004-133240 4/2004

* cited by examiner

*Primary Examiner* — Amare Mengistu
*Assistant Examiner* — Antonio Xavier
(74) *Attorney, Agent, or Firm* — Rader, Fishman & Grauer PLLC

(57) ABSTRACT

A panel, display device and control method in which pixels each have a light emitting element. The potential of the video signal line is switched to a low potential before writing, a high potential during writing, and an intermediate potential after writing has been performed. Switching of the power supply lines from the high potential to the low potential is performed in a period after the potential of the video signal line has been switched from the high potential to the immediate potential, before the potential of the video signal line is switched from the intermediate potential to the low potential.

12 Claims, 15 Drawing Sheets

LIGHT EMISSION PERIOD T1

EXTINCTION PERIOD T2

THRESHOLD CORRECTION PREPARATION PERIOD T3

THRESHOLD CORRECTION WAITING PERIOD T4

THRESHOLD CORRECTION PERIOD T5

WRITING + MOBILITY CORRECTION PERIOD T11

PANEL, CONTROL METHOD THEREOF, DISPLAY DEVICE AND ELECTRONIC APPARATUS

BACKGROUND OF THE INVENTION

1. Field of the Invention

The invention relates to a panel, a control method thereof, a display device and an electronic apparatus, and particularly relates to a panel, a control method thereof, a display device and an electronic apparatus capable of keeping display quality of a screen of the panel.

2. Description of the Related Art

In recent years, a planar self-luminous panel (hereinafter, referred to as "organic EL panel") using an organic EL (Electro Luminescent) element as a light emitting element is well developed (for example, refer to Patent Documents 1 to 5 below). The organic EL element is a light emitting element utilizing a phenomenon of an organic thin film which emits light when an electric field is applied. The organic EL element has a feature of low power consumption as it is driven by an application voltage of 10V or less. The organic EL element also has a feature that makes the element light and thin easily without an illumination member because the organic EL element is a self-luminous element which emits light by itself. The organic EL element further has a feature in which an afterimage is not generated at the time of displaying moving pictures because response speed of the organic EL element is extremely high, that is, approximately several μs.

Patent Document 1: JP-A-2003-255856
Patent Document 2: JP-A-2003-271095
Patent Document 3: JP-A-2004-133240
Patent Document 4: JP-A-2004-029791
Patent Document 5: JP-A-2004-093682

SUMMARY OF THE INVENTION

However, in the organic EL panel in related art, light emission luminance may be non-uniform within a screen thereof, as a result, display quality of the screen is likely to be reduced.

In view of the above, it is desirable to keep display quality in the screen of the panel.

According to an embodiment of the invention, there is provided a panel in which pixels each having a light emitting element emitting light corresponding to electric current, a sampling transistor sampling a video signal, a drive transistor supplying the electric current to the light emitting element and a storage capacitor storing a given potential are arranged in a matrix state, and in which power supply lines propagating signals of power supply to the pixels existing in the same row and scanning lines propagating signals of the scanning lines are arranged with respect to respective rows, which includes a power supply line potential control means for switching the potential of the plural power supply lines belonging to the same unit at the same time according to each unit in which the plural power supply lines are grouped and a scanning line potential control means for starting writing of a signal potential of the video signal to the storage capacitor by switching the potential of the scanning line from a low potential to a high potential, and for completing the writing as well as starting light emission of the pixels by switching the potential of the scanning line from the high potential to the low potential according to each row, in which wherein the potential of the video signal line is switched to a low potential before the writing is performed, a high potential at the time of writing and an intermediate potential after the writing has been performed repeatedly in this order, and the switching operation of the potential of the power supply lines of all units from the high potential to the low potential by the power supply line potential control means is performed in a period after the potential of the video signal line has been switched from the high potential to the immediate potential before the potential of the video signal line is switched from the intermediate potential to the low potential.

The intermediate potential and the low potential are set to the same potential.

A control method of the panel according to an embodiment of the invention is the control method of the above-described panel according to the embodiment of the invention.

According to an embodiment of the invention, there is provided a display device including a panel displaying images by allowing respective pixels to emit light with gradation corresponding to video signals, in which, in the panel, pixels each having a light emitting element emitting light corresponding to electric current, a sampling transistor sampling the video signal, a drive transistor supplying the electric current to the light emitting element and a storage capacitor storing a given potential are arranged in a matrix state, and power supply lines propagating signals of power supply to the pixels existing in the same row and scanning lines propagating signals of the scanning lines are arranged with respect to respective rows, in which the panel includes a power supply line potential control means for switching the potential of the plural power supply lines belonging to the same unit at the same time according to each unit in which the plural power supply lines are grouped and a scanning line potential control means for starting writing of a signal potential of the video signal to the storage capacitor by switching the potential of the scanning line from a low potential to a high potential, and for completing the writing as well as starting light emission of the pixels by switching the potential of the scanning line from the high potential to the low potential according to each row, the potential of the video signal line is switched to a low potential before the writing is performed, a high potential at the time of writing and an intermediate potential after the writing has been performed repeatedly in this order, and the switching operation of the potential of the power supply lines of all units from the high potential to the low potential by the power supply line potential control means is performed in a period after the potential of the video signal line has been switched from the high potential to the immediate potential before the potential of the video signal line is switched from the intermediate potential to the low potential.

According to an embodiment of the invention, there is provided an electronic apparatus including a display unit having a panel displaying images by allowing respective pixels to emit light with gradation corresponding to video signals, in which, in the panel, pixels each having a light emitting element emitting light corresponding to electric current, a sampling transistor sampling a video signal, a drive transistor supplying the electric current to the light emitting element and a storage capacitor storing a given potential are arranged in a matrix state, and power supply lines propagating signals of power supply to the pixels existing in the same row and scanning lines propagating signals of the scanning lines are arranged with respect to respective rows, in which the panel includes a power supply line potential control means for switching the potential of the plural power supply lines belonging to the same unit at the same time according to each unit in which the plural power supply lines are grouped and a scanning line potential control means for starting writing of a signal potential of the video signal to the storage capacitor by switching the potential of the scanning line from a low potential to a high potential, and for completing the writing as well as starting light emission of the pixels by switching the potential of the scanning line from the high potential to the low potential according to each row, the potential of the video signal line is switched to a low potential before the writing is performed, a high potential at the time of writing and an intermediate potential after the writing has been performed repeatedly in this order, and the switching operation of the potential of the power supply lines of all units from the high potential to the low potential by the power supply line potential control means is performed in a period after the potential of the video signal line has been switched from the high potential to the immediate potential before the potential of the video signal line is switched from the intermediate potential to the low potential.

According to an embodiment of the invention, the operation of switching the potential of the video signal line to a low potential before the writing is performed, a high potential at the time of writing and an intermediate potential after the writing has been performed repeatedly in this order, and the switching operation of the potential of the power supply lines of all units from the high potential to the low potential by the power supply line potential control means is performed in a period after the potential of the video signal line has been switched from the high potential to the immediate potential before the potential of the video signal line is switched from the intermediate potential to the low potential by using a panel in which pixels each having a light emitting element emitting light corresponding to electric current, a sampling transistor sampling a video signal, a drive transistor supplying the electric current to the light emitting element and a storage capacitor storing a given potential are arranged in a matrix state, and in which power supply lines propagating signals of power supply to the pixels existing in the same row and scanning lines propagating signals of the scanning lines are arranged with respect to respective rows, which includes a power supply line potential control means for switching the potential of the plural power supply lines belonging to the same unit at the same time according to each unit in which the plural power supply lines are grouped, and a scanning line potential control means for starting writing of a signal potential of the video signal to the storage capacitor by switching the potential of the scanning line from a low potential to a high potential, and for completing the writing as well as starting light emission of the pixels by switching the potential of the scanning line from the high potential to the low potential according to each row.

According to an embodiment of the invention, display quality of the screen of the panel can be maintained.

BRIEF. DESCRIPTION OF THE DRAWINGS

DETAILED DESCRIPTION OF THE INVENTION

Hereinafter, an embodiment of a penal to which the invention is applied will be explained with reference to the drawings.

<Configuration Example of an Organic EL Panel to which a Basic Drive Method is Applied>

First, in order to make understanding of the invention easier as well as to clarify the background, an organic EL panel to which a fundamental drive method (hereinafter, refer to a basic drive method) is applied will be explained with reference to FIG. 1.

Figure 1:
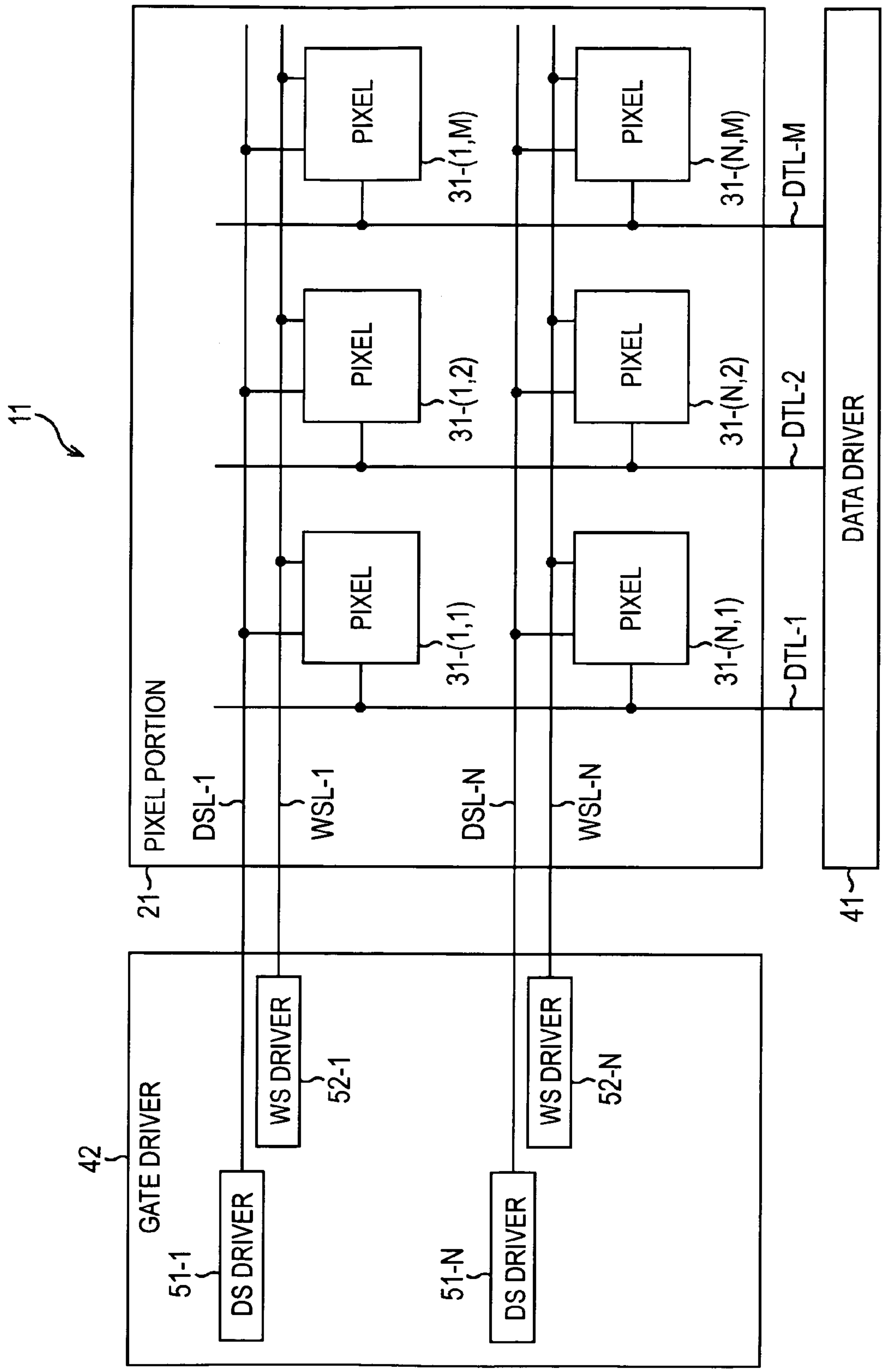
FIG. 1 is a block diagram showing a configuration example of an organic EL panel to which a basic drive method is applied.

FIG. 1 is a block diagram showing a configuration example of an organic EL panel to which the basic drive method is applied.

An organic EL panel 11 in the example of FIG. 1 is an active matrix type organic EL panel. A pixel portion 21 is provided in the organic EL panel 11. In the pixel portion 21, N×M pieces of pixels 31-(1,1) to 31-(N,M) are arranged in a matrix state. "N" and "M" are integer values of 1 or more which are mutually independent. The organic EL panel 11 is also provided with a data driver 41 and a gate driver 42 as drive units for driving the pixel portion 21. The data driver 41 and the gate driver 42 are formed by, for example, a driver IC (Integrated Circuit). In the example, the gate driver 42 is arranged outside the pixel portion 21 at one side thereof. However, the arrangement of the gate driver 42 is not particularly limited, and for example, the gate driver 42 may be arranged outside the pixel portion 21 at both sides thereof.

Figure 2:
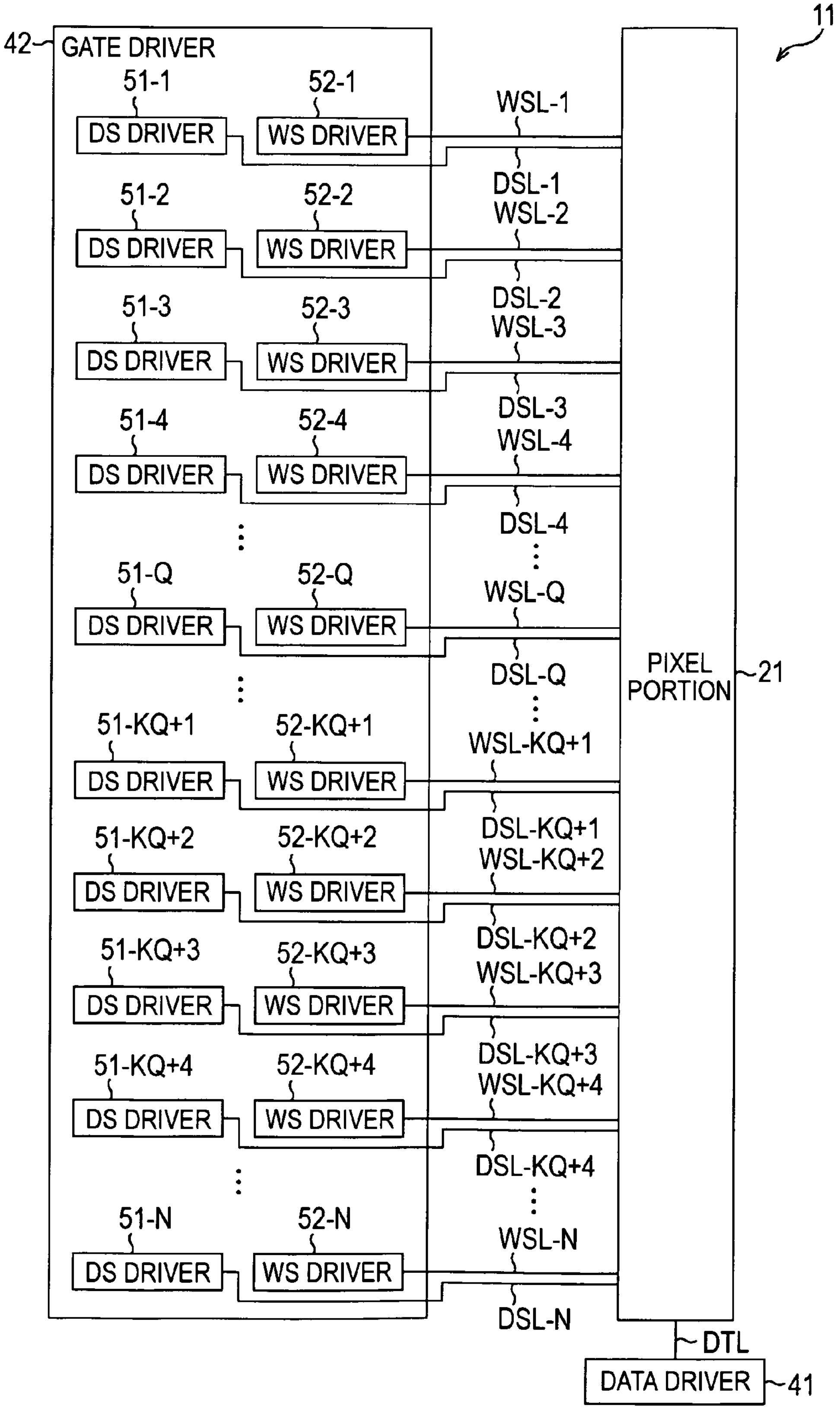
FIG. 2 is a view showing a configuration example of a gate driver of FIG. 1.

FIG. 2 is a block diagram showing a configuration example of a gate driver 42 of the organic EL panel 11 to which the basic drive method is applied.

The gate driver 42 includes DS drivers 51-1 to 51-N and WS drivers 52-1 to 52-N. Signs such as Q and K shown in FIG. 2 are signs to be associated with FIG. 3, therefore, they will be explained in conjunction with explanation of FIG. 3.

The organic EL panel 11 also includes N-pieces of scanning lines WSL-1 to WSL-N, N-pieces of power supply lines DSL-1 to DSL-N and M-pieces of video signal lines DTL-1 to DTL-M.

When it is not necessary that the respective scanning lines WSL-1 to WSL-N, the video signal lines DTL-1 to DTL-M and the power supply lines DSL-1 to DSL-N are distinguished from one another, they are referred to as merely scanning lines WSL, video signal lines DTL and power supply lines DSL respectively in the following description. Also, when it is not necessary that the respective pixels 31-(1,1) to 31-(N,M), the DS drivers 51-1 to 51-N, and the WS drivers 52-1 to 52-N are distinguished from one another, they are referred to as merely pixels 31, DS drivers 51 and WS drivers 52 respectively in the following description.

As shown in FIG. 1, pixels 31-(1,1) to 31-(1,M) of the first row are connected to the WS driver 52-1 by the scanning line WSL-1 and connected to the DS driver 51-1 by the power supply line DSL-1 respectively. Pixels 31-(N,1) to 31-(N,M) of the N-th row are connected to the WS driver 52-N by the scanning line WSL-N and connected to the DS driver 51-N by the power supply line DSL-N respectively. Pixels 31 of other rows are connected in the same manner.

Additionally, pixels 31-(1,1) to 31-(N,1) of the first column are connected to the data driver 41 by the video signal line DTL-1. Pixels 31-(1,2) to 31-(N,2) of the second column are connected to the data driver 41 by the video signal line DTL-2. Pixels 31-(1,M) to pixels 31-(N,M) of the M-th are connected to the data driver 41 by the video signal line DTL-M. Pixels 31 of other columns are connected in the same manner.

The gate driver 42 sequentially drives the WS drivers 52-1 to 52-N to thereby perform line sequential scanning of pixels 31 row by row by sequentially switching the potential of the scanning lines WSL-1 to WSL-N in a horizontal period (referred to as 1H in the following description). The gate driver 42 also drives the DS drivers 51-1 to 51-N to thereby switch the potential of the power supply lines DSL-1 to DSL-N to a high potential or a low potential in accordance with the line sequential scanning. The data driver 41 switches the potential of video signal lines DTL-1 to DTL-M to a signal voltage Vsig or a reference voltage Vofs of the video signal in each 1H in accordance with the line sequential scanning.

<Configuration Example of the Organic EL Panel to which the Invention is Applied>

As the basic drive method, a unit scanning drive method is applied in the invention. The unit scanning drive method is a drive method in which the DS driver is used by plural power supply lines DSL in common.

In the unit scanning drive method, an aggregation of all pixels connected to the common DS driver, or an aggregation of all power supply lines DSL connected to the common DS driver is called a unit. The number of DS drivers can be suppressed by applying the unit scanning drive method. For example, when the number of pixels in the vertical direction (V direction) of a screen of the organic EL panel is 540, 540 pieces of DS drivers are necessary in the basic drive method. On the other hand, in the unit scanning drive method, when an aggregation of 30 pieces of power supply lines DSL is regarded as one unit, 18 pieces of DS drivers are necessary, which is 1/30 (=540/30) as compared with the case of the basic drive method. Accordingly, the number of DS drivers can be suppressed in the unit scanning drive method, therefore, costs can be drastically reduced.

Figure 3:
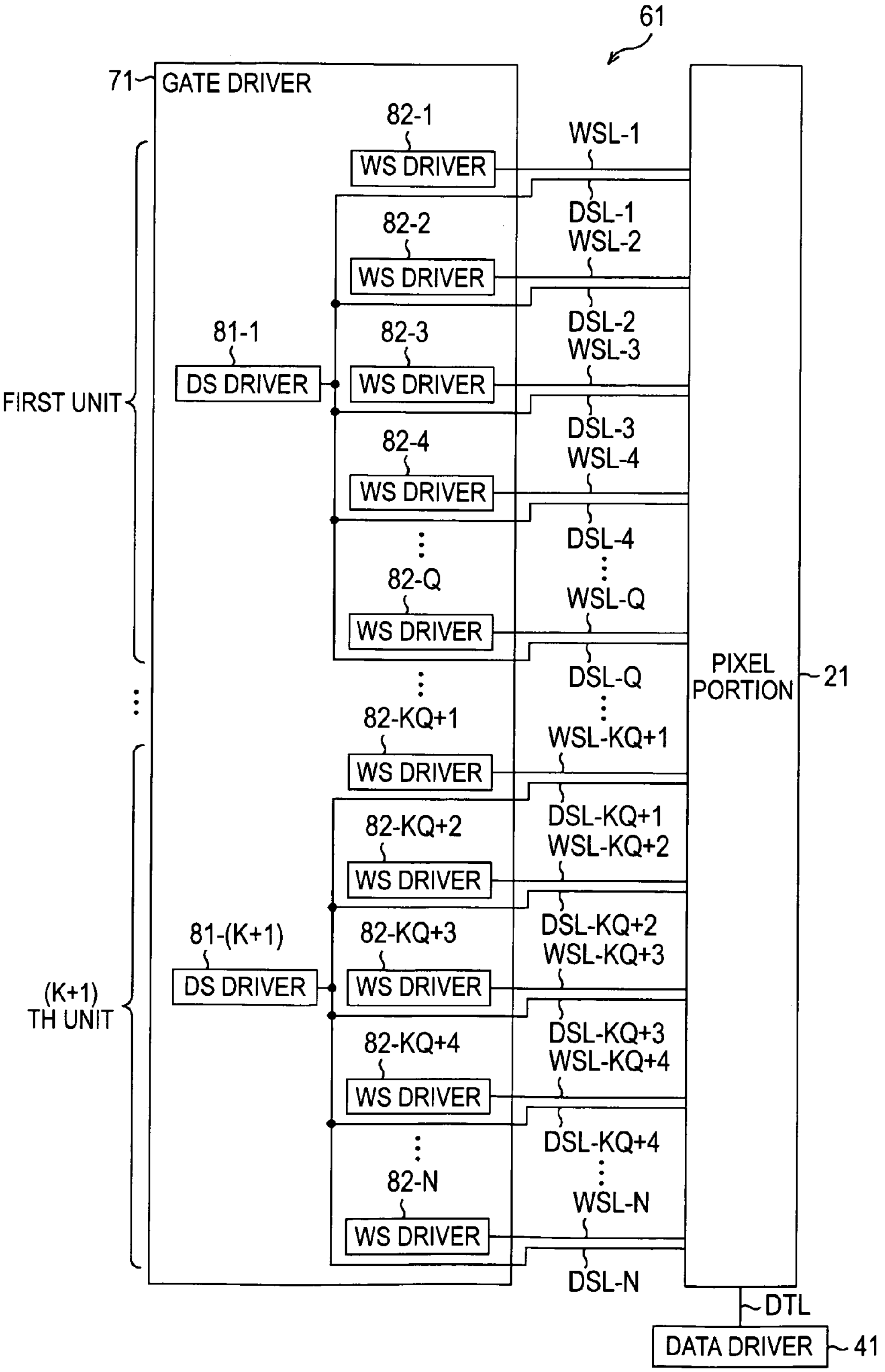
FIG. 3 is a view showing a configuration example of an organic EL panel to which the invention is applied.

FIG. 3 is a block diagram showing a configuration example of an organic EL panel to which the invention is applied, that is, the unit scanning drive method is applied.

An organic EL panel 61 of FIG. 3 is an active matrix type organic EL panel. The pixel portion 21 is provided in the organic EL panel 61 in the same manner as the example of FIG. 1.

The organic EL panel 61 is also provided with the data driver 41 having the same configuration as the example of FIG. 1 and a gate driver 71 having a different configuration from the gate driver 42 as a drive unit for driving the pixel portion 21. That is, the organic EL panel 61 in the example of FIG. 3 has a configuration in which the gate driver 71 having the configuration of FIG. 3 is applied instead of the gate driver 42 having the configuration of FIG. 2 as compared with the configuration of the organic EL panel 11 in the example of FIG. 1. The gate driver 71 is formed by, for example, the driver IC. In the example, the gate driver 71 is arranged outside the pixel portion 21 at one side thereof. However, the arrangement of the gate driver 71 is not particularly limited, and for example, the gate driver 71 may be arranged outside the pixel portion 21 at both sides thereof.

The gate driver 71 includes K+1 pieces of DS drivers 81-1 to 81-(K+1) and WS drivers 82-1 to 82-N. K is an integer satisfying "K+1=N/Q". Q is a value indicating the number of power supply lines DSL belonging to one unit, which is a value of 2 or more. That is, each of DS drivers 81-1 to 81-(K+1) is a DS driver used by Q pieces of power supply lines. DSL in common. In other words, respective DS drivers 81-1 to 81-(K+1) are DS drivers provided for respective the first to the (K+1) th units. In the R-th unit (R is any of integers of 1 to "K+1"), one DS driver 81-R is used by the Q pieces of power supply lines DSL-RQ+1 to DSL-(R+1)Q in common. When it is not necessary to particularly consider the unit, the DS driver 81-R is merely referred to as the DS driver 81 in the following description.

The connection state of the WS drivers 82-1 to 82-N is fundamentally the same as the connection state of the WS drivers 52-1 to 52-N of FIG. 2. Therefore, the explanation thereof is omitted.

Next, a detailed example of each pixel 31 included in the organic EL panel 61 will be explained.

<Detailed Configuration Example of the Pixel 31>

Figure 4:
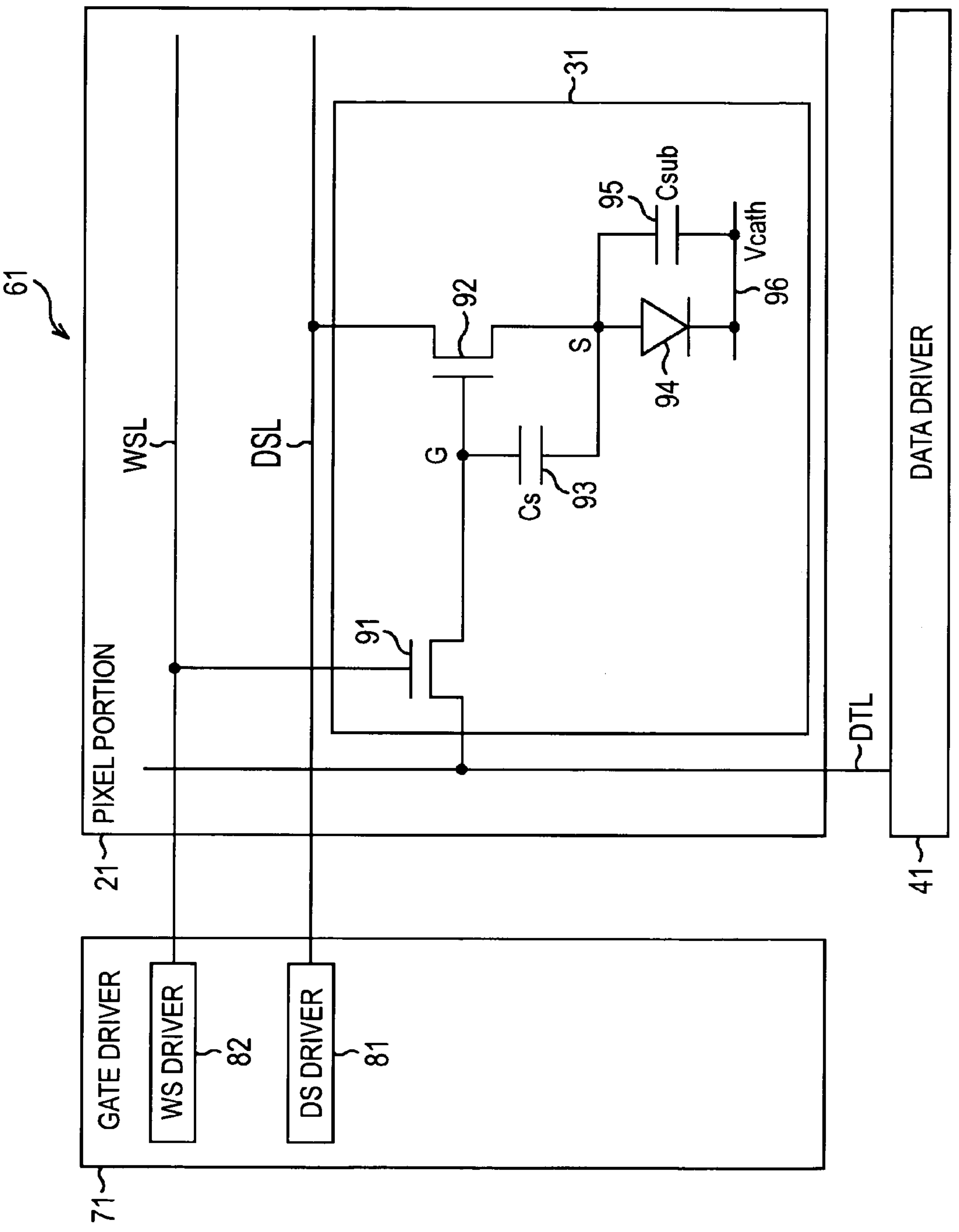
FIG. 4 is a view showing a detailed configuration example of the pixel in FIG. 3.

FIG. 4 is a block diagram showing a detailed configuration example of the pixel 31.

In FIG. 4, the same numerals are given to components corresponding to FIG. 3 and explanation will be appropriately omitted in the following description.

In FIG. 4, one of N×M pieces of pixels 31 included in the organic EL panel 61 of FIG. 3 is shown in an enlarged manner.

The pixel 31 includes a sampling transistor 91, a drive transistor 92, a storage capacitor 93, a light emitting element 94 which is an organic EL element and an auxiliary capacitor 95. In the example of FIG. 4, the sampling transistor 91 and the drive transistor 92 are formed by using an N-channel transistor, respectively. A gate of the sampling transistor 91 is connected to the scanning line WSL. A drain of the sampling transistor 91 is connected to the video signal line DTL. A source of the sampling transistor 91 is connected to a gate G of the drive transistor 92.

In the example of FIG. 4, the pixel 31 includes two transistors which are the sampling transistor 91 and the drive transistor 92. A pixel circuit having the configuration is referred to as a 2Tr (transistor) pixel circuit. It should be noted that the pixel 31 is not limited to the 2Tr pixel circuit.

A drain of the drive transistor 92 is connected to the power supply line DSL. A source S of the drive transistor 92 is connected to an anode of the light emitting element 94. The storage capacitor 93 is connected between the gate G and the source S of the drive transistor 92. A capacitor value of the storage capacitor 93 is written as Cs in the following description. A cathode of the light emitting element 94 is connected to a wiring 96. Therefore, a value of the cathode potential of the light emitting element 94 will be a potential Vcath of the wiring 96.

The auxiliary capacitor 95 is connected between the anode of the light emitting element 94 (source S of the drive transistor 92) and the wiring 96. A capacitor value of the auxiliary capacitor 95 is written as Csub in the following description.

Since the light emitting element 94 is an electric current light emitting element, gradation of light emission luminance can be changed by controlling an electric current value. In the pixel 31 of FIG. 4, the potential of the gate G of the drive transistor 92 (referred to as a gate potential in the following description) is changed to thereby control the electric current value of the light emitting element 94, as a result, graduation of light emission luminance can be changed.

The drive transistor 92 is designed to be operated in a saturation region. That is, the drain of the drive transistor 92 is connected to the power supply line DSL and the potential of the power supply line DSL is made to be a high potential, thereby operating the drive transistor 92 in the saturation region. The saturation region is a region in which $Vgs-Vth<Vds$ is satisfied. Vds indicates a voltage between the drain and the source S of the drive transistor 92 (referred to as a drain-source voltage in the following description). Vth indicates a threshold voltage of the drive transistor 92. Vgs indicates a voltage between the gate G and the source S of the drive transistor 92 (referred to as a gate-source voltage in the following description). The drive transistor 92 operating in the saturation region functions as a constant current source which allows constant current to flow between the drain and the source S. The electric current flowing between the drain and the source S of the drive transistor 92 is referred to as a drain-source current in the following description and an electric current value thereof is written as Ids. The drain-source current Ids can be represented by the following formula (1).

$$Ids = \frac{1}{2} M \frac{W}{L} Cox(Vgs - Vth)^2 \quad (1)$$

In the formula (1), μ represents mobility, W represents a gate width, L represents a gate length and Cox represents a gate oxide film capacitance per unit area, respectively.

The sampling transistor 91 is turned on (conductive) in accordance with the potential of a control signal supplied from the WS driver 82 through the scanning line. WSL. When the sampling transistor 91 is turned on, the storage capacitor 93 stores the signal potential Vsig of the video signal supplied from the data driver 41 through the video signal line DTL. The drive transistor 92 receives supply of electric current from the power supply line DSL in the high potential, allowing the drain-source current corresponding to the signal potential Vsig stored in the storage capacitor 93 to flow in the light emitting element 94. The drain-source current flowing in the light emitting element 94 is also referred to as a drive current appropriately in the following description. When the drive current more than a fixed value flows in the light emitting element 94, the light emitting element 94 (pixel 31) emits light.

The pixel 31 has a threshold correction function. The threshold correction function is a function of allowing the storage capacitor 93 to store a voltage corresponding to the threshold voltage Vth of the drive transistor 92. According to the threshold correction function, effects of variation in the threshold voltage Vth of the drive transistor 92 can be cancelled. The variation in the threshold voltage Vth of the drive transistor 92 is one of the causes of variation in light emission luminance in respective pixels 31. Therefore, the variation of light emission luminance in respective pixels 31 can be suppressed to a certain degree.

The pixel 31 further has a mobility correction function in addition to the above threshold correction function. The mobility correction function is a function of adding correction concerning the mobility g of the drive transistor 92 to the signal potential Vsig when allowing the storage capacitor 93 to store the signal potential Vsig.

The pixel 31 further has a bootstrap function. The bootstrap function is a function of allowing the potential of the gate G to follow the variation of the potential of the source S of the drive transistor 92. In other words, the bootstrap function is a function of keeping the gate-source voltage of the drive transistor 92 constant.

Next, a basic method in the unit scanning drive method (referred to as a basic unit scanning drive method in the following description) will be explained with reference to FIG. 5 to FIG. 17.

<Operation Example of the Pixel 31 Driven by the Basic Unit Scanning Drive Method>

Figure 5:
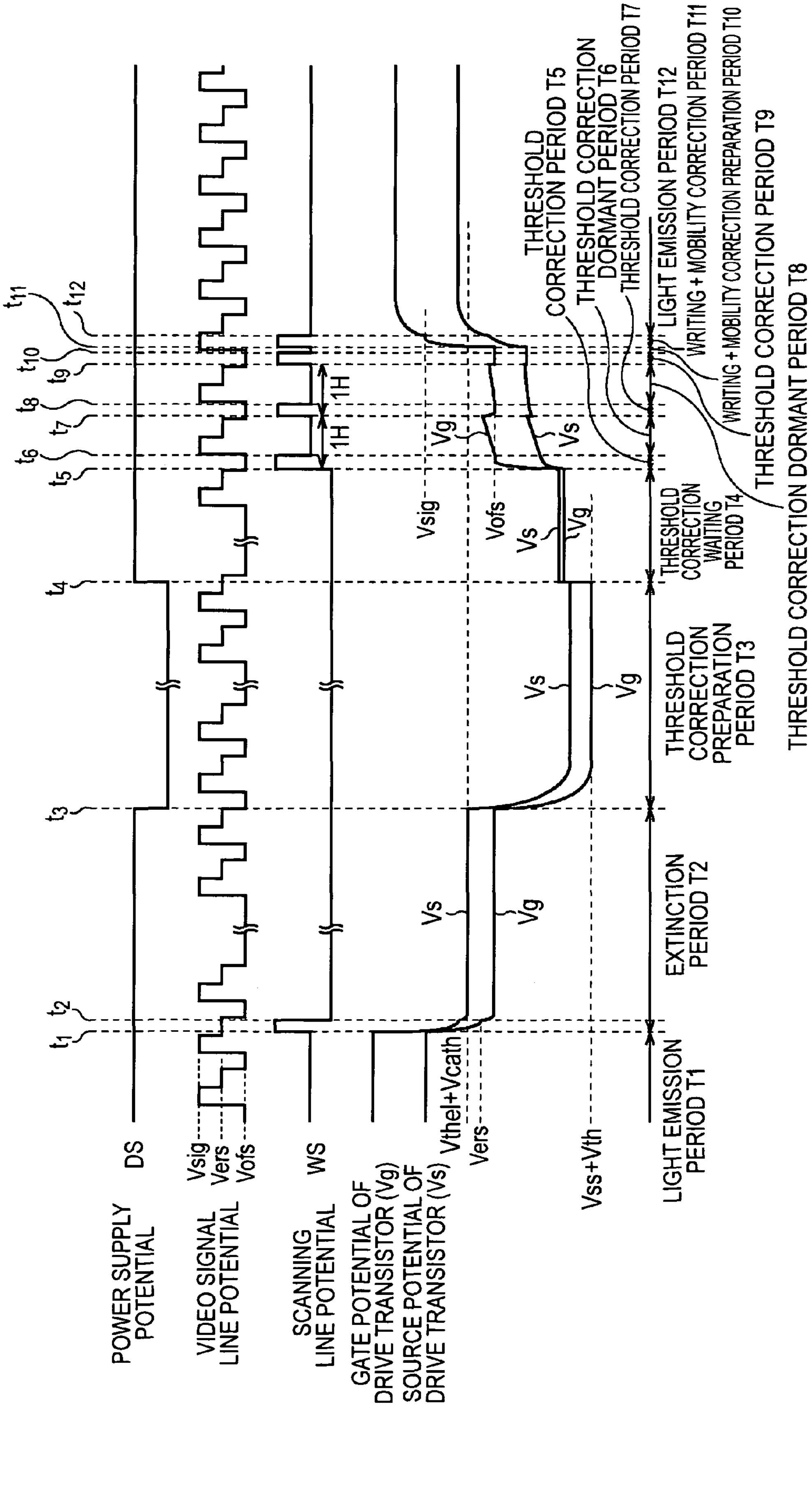
FIG. 5 is a timing chart explaining an operation example of the pixel in FIG. 3.

FIG. 5 is a timing chart explaining an operation example of the pixel 31 driven by the basic unit scanning drive method. In this example, the operation example of the pixels 31 in the first row of the first unit which will be described later is shown.

FIG. 6 to FIG. 11 are views showing examples of potentials of respective terminals of the drive transistor 92 in a later described light emission period T1, an extinction period T2, a threshold correction preparation period T3, a threshold correction waiting period T4, a threshold correction period T5 and a wiring+mobility correction period T11, respectively.

FIG. 5 shows examples of variations of a potential DS of the power supply line DSL, potentials of video signal line, a potential WS of the scanning line WSL, the gate potential Vg of the drive transistor 92 and a source potential Vs of the drive transistor 92 with respect to the time axis in the horizontal direction of the drawing.

Figure 6:
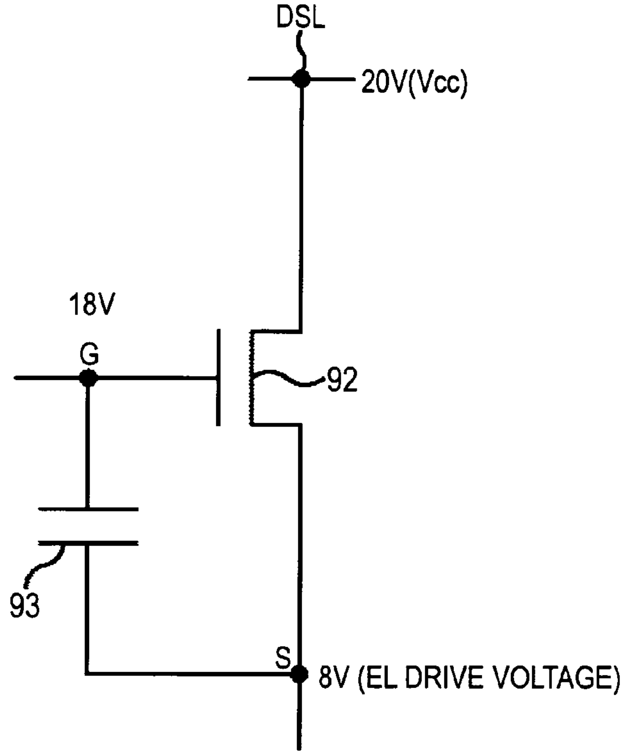
FIG. 6 is a view for explaining the operation example of the pixel in FIG. 3.

A period until a time point $t_1$ in FIG. 5 corresponds to the light emission period T1 during which the light emitting element 94 emits light. In the light emitting T1, the power supply line potential DS is, for example, Vcc (=20V) as shown in FIG. 6. The source potential Vs in the light emission period T1 at the time of normal light emission is 8V. The source potential Vs is appropriately referred to as an EL drive voltage Vs in the following description. The gate potential Vg is 18V.

A period from the time point $t_1$ to a time point $t_3$ corresponds to the extinction period T2 during which the light emitting element 94 is extinguished. The time point $t_1$ is a time point indicating the timing after the video signal line potential has been switched to an extinction potential Vers from the signal potential Vsig. In the time point $t_1$, the WS driver 82 switches the scanning line potential WS from the low potential to the high potential to turn on the sampling transistor 91. According to this, the gate potential Vg is reduced to the extinction potential Vers. At this time, the source potential Vs is also reduced by the coupling through the storage capacitor 93. Accordingly, the drive transistor 92 is cut off and light emission of the light emitting element 94 is stopped. That is, the light emitting element 94 is extinguished.

Figure 7:
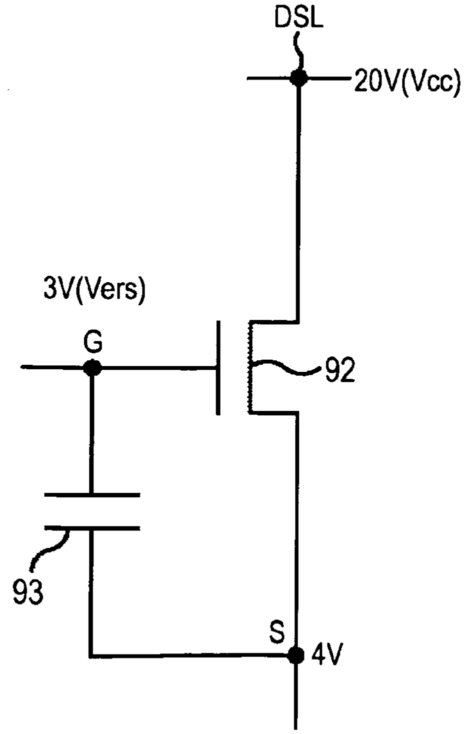
FIG. 7 is a view for explaining the operation example of the pixel in FIG. 3.

The time point $t_2$ is a time point showing the timing before the video signal line potential is switched to a reference potential Vofs. In the time point $t_2$, the WS driver 82 switches the scanning line potential WS to the low potential to turn off the sampling transistor 91. According to this, the gate G of the drive transistor 92 becomes in a floating state. In a period from the time point $t_2$ to the time point $t_3$, the source potential Vs is reduced to Vthel+Vcath (4V in this case) as shown in FIG. 7. Vthel represents an EL threshold voltage of the light emitting element 94. In this period, the gate potential Vg is also reduced.

Figure 8:
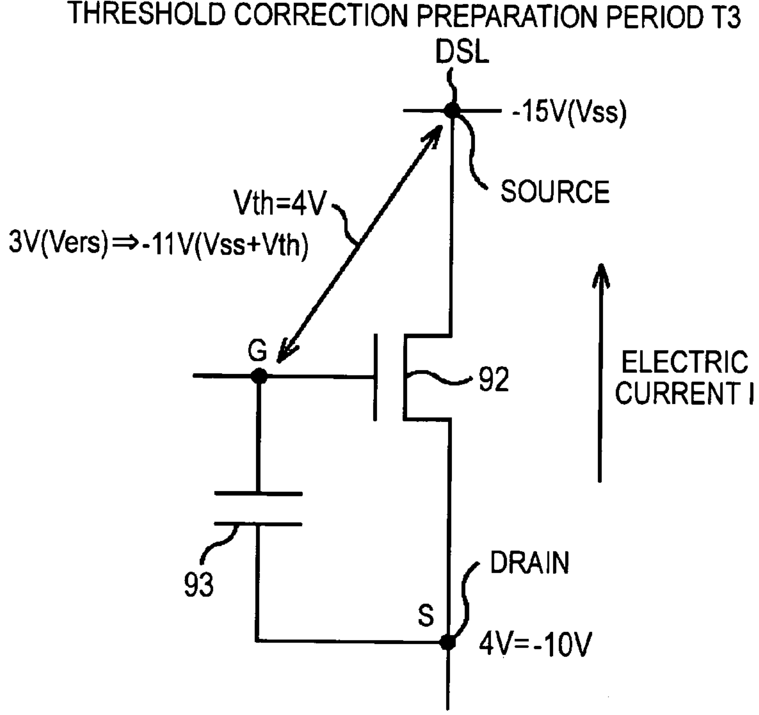
FIG. 8 is a view for explaining the operation example of the pixel in FIG. 3.

A period from the time point $t_3$ to a time point $t_4$ corresponds to the threshold correction preparation period T3 during which preparation for threshold correction is made. In order to perform threshold correction, it is necessary to allow the gate-source voltage Vgs of the drive transistor 92 to be more than the threshold voltage Vth. Therefore, in the threshold correction preparation period T3, preparation of the threshold correction is made so that the gate-source voltage Vgs of the drive transistor 92 becomes more than the threshold voltage Vth. In the time point $t_3$, the DS driver 81 switches the power supply line potential DS to a low potential Vss (−15V) as shown in FIG. 8. According to this, the source potential Vs and the gate potential Vg are reduced. The drain of the drive transistor 92 serves as the source, and the source S of the drive transistor 92 serves as the drain. As a result, an electric current I flows from the source S of the drive transistor 92 to the drain and the threshold correction (referred to as a reverse threshold correction in the following description) is performed so that the voltage between the drain (serving as the source) and the gate G of the drive transistor 92 becomes Vth (=4V). Accordingly, the gate potential Vg is reduced. The gate potential Vg after reduction is Vss+Vth. For example, when the low potential Vss is −15V and the threshold voltage Vth is 4V, the gate potential Vg after reduction will be −11V (=−15V+4V). The source potential Vs is also reduced. The source potential Vs after reduction will be −10V.

Figure 9:
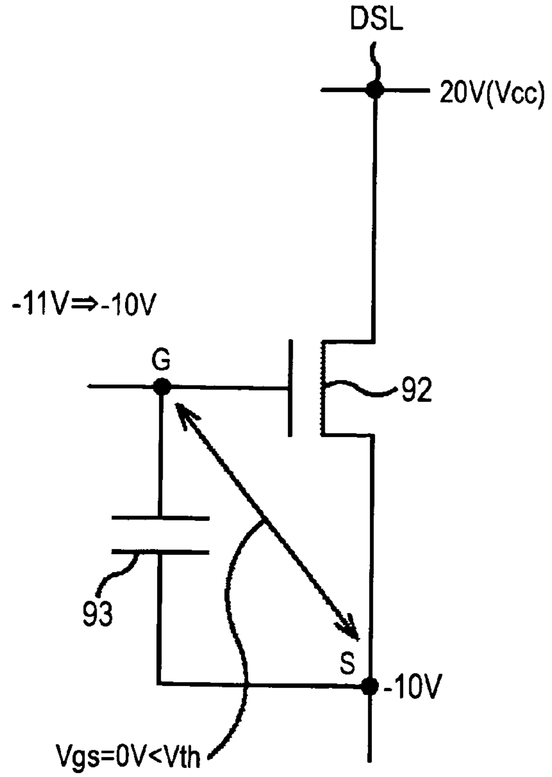
FIG. 9 is a view for explaining the operation example of the pixel in FIG. 3.

A period from the time point $t_4$ to a time point $t_5$ corresponds to the threshold correction waiting period T4 as a waiting period until the threshold correction. In the time point $t_4$, the DS driver 81 switches the power supply line potential DS to the high potential Vcc. According to this, the gate potential Vg is increased from −11V to −10V as shown in FIG. 9. The source potential Vs is almost the same potential at −10V. Therefore, the gate-source voltage Vgs changes from 1V to approximately 0V. Since Vgs<Vth(=4V) is satisfied in the period from the time point $t_4$ to the time point $t_5$, the threshold correction is not started.

Figure 10:
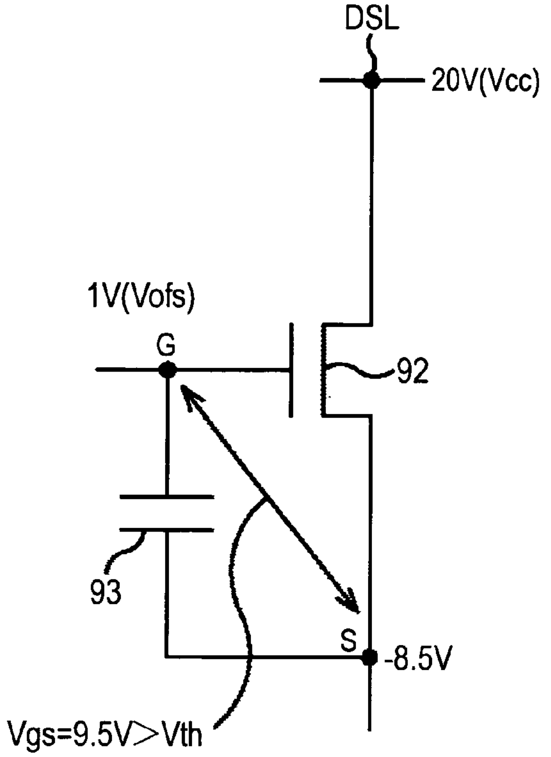
FIG. 10 is a view for explaining the operation example of the pixel in FIG. 3.

A period from the time point $t_5$ to a time point $t_6$ corresponds to the threshold correction period T5 in which threshold correction is performed. The time point $t_5$ is a time point indicating the timing after the video signal line potential has been switched to the reference potential Vofs. In the time point $t_5$, the WS driver 82 switches the scanning line potential WS to the high potential to turn on the sampling transistor 91. According to this, the gate potential Vg of the drive transistor 92 becomes the reference potential Vofs (=1V) from −10V as shown in FIG. 10. The source potential Vs is increased by approximately 1.5V and becomes −8.5V from −10V due the coupling with the change of the gate potential Vg through the storage capacitor 93. As a result, the gate-source voltage Vgs becomes 9.5V (=1−(−8.5)) and Vgs>Vth (=4V) is satisfied. Accordingly, the threshold correction is started. When the threshold correction is started, electric current flows from the drain of the drive transistor 92 to the source S, and the source potential Vs is increased. During the period, the gate potential Vg is fixed. According to this, the gate-source voltage Vgs is reduced and writing of the threshold voltage Vth to the storage capacitor 93 is performed.

In this example, the threshold correction is performed three times in one frame period (hereinafter, referred to as 1F) in which one frame is displayed. However, the number of times of threshold correction in 1F is not limited to three times. That is, the number of times of threshold correction can be once, twice or four times or more. The threshold correction during the period from the time point $t_5$ to the time point $t_6$ is referred to as the first threshold correction in the following description.

A period from the time point $t_6$ to a time point $t_7$ corresponds to a threshold correction dormant period T6 in which the threshold correction pauses. The time point $t_6$ is a time point indicating the timing before the video signal line potential is switched from the reference potential Vofs to the signal potential Vsig. In the time point $t_6$, the WS driver 82 switches the scanning line potential WS to the low potential to turn off the sampling transistor 91. According to this, the gate G of the drive transistor 92 becomes in the floating state. In this example, the first threshold correction is insufficient. That is, Vgs>Vth is satisfied at the time of the time t6. In the example, electric current flows from the drain to the source S and the gate potential Vg and the source potential Vs is increased in the period from the time point $t_6$ to the point $t_7$. In the period, the gate-source voltage Vgs is maintained.

A period from the time point $t_7$ to a time point $t_8$ corresponds to a threshold correction period T7 in which threshold correction is performed. The threshold correction is referred to as the second threshold correction in the following description. The time point $t_7$ is a time point indicating the timing after the video signal line potential has been switched to the reference potential Vofs. In the time point $t_7$, the WS driver 82 switches the scanning line potential WS to the high potential to turn on the sampling transistor 91. Accordingly, the gate potential Vg of the drive transistor 92 becomes the reference potential Vofs. Electric current flows from the drain of the drive transistor 92 to the source S and the source potential Vs is increased. According to this, the gate-source voltage Vgs is reduced and the writing to the storage capacity 93 is performed.

A period from the time point $t_8$ to a time point $t_8$ corresponds to a threshold correction dormant period T8 in which the threshold correction pauses. The time point $t_8$ is a timing before the video signal line potential is switched to the signal potential Vsig. In the time point $t_8$, the WS driver 52 switches the scanning line potential WS to the low potential to turn off the sampling transistor 91. According to this, the gate G of the drive transistor 92 becomes in the floating state. In the example, the second threshold correction is insufficient. That is, Vgs>Vth is satisfied at the time of the time point $t_8$. In this case, in the period from the time point $t_8$ to the time point $t_9$, electric current flows from the drain to the source S and the gate potential Vg and the source potential Vs is increased. In the period, the gate-source voltage Vgs is maintained.

The period from the time point $t_5$ to the time point $t_7$ or the period from the time point $t_7$ to the time point $t_9$ corresponds to the horizontal period (1H).

A period from the time point $t_9$ to a time point $t_{10}$ corresponds to a threshold correction period T9 in which threshold correction is performed. The threshold correction is referred to as the third threshold correction. The time point $t_9$ is a time period indicating the timing after the video signal line potential has been switched to the reference potential Vofs. In the time point $t_9$, the WS driver 82 switches the scanning line potential WS to the high potential to turn on the sampling transistor 91. According to this, the gate potential Vg of the drive transistor 92 becomes the reference potential Vofs. Electric current flows from the drain of the drive transistor 92 to the source S and the source potential Vs is increased. According to this, the gate-source voltage Vgs is reduced and writing to the storage capacitor 93 is performed. The writing is performed until the drive transistor 92 is cut off, that it, until Vgs=Vth is satisfied. In the example of FIG. 5, Vgs=Vth is satisfied during the period from the time point $t_9$ to the time point $t_{10}$.

A period from the time point $t_{10}$ to a time period $t_{11}$ corresponds to a writing+mobility correction preparation period T10 in which writing of the video signal and preparation for mobility correction are performed. The time point $t_{10}$ is the time point indicating the timing before the video signal line potential is switched to the signal potential Vsig. In the time point $t_{10}$, the WS driver 82 switches the scanning line potential WS to the low potential to turn off the sampling transistor 91. According to this, the gate G of the drive transistor 92 becomes in the floating state. In the period from the time point $t_{10}$ to the time point $t_{11}$, the data driver 41 switches the video signal line potential to the signal potential Vsig.

Figure 11:
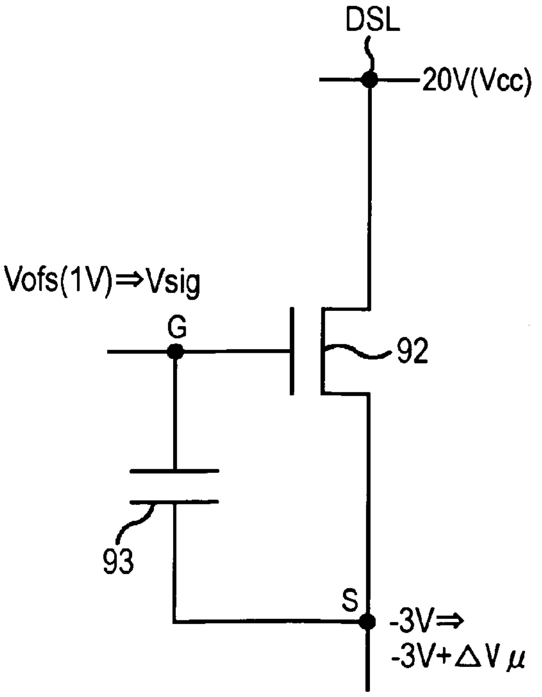
FIG. 11 is a view for explaining the operation example of the pixel in FIG. 3.

A period from the time point $t_{11}$ to a time point $t_{12}$ corresponds to a writing+mobility correction period T11 in which writing of the video signal and mobility correction are performed. In the time period t11, the WS driver 82 switches the scanning line potential WS to the high potential to turn on the sampling transistor 91. According to this, the gate potential Vg of the drive transistor 92 is increased from the reference potential Vofs (=1V) to the signal potential Vsig as shown in FIG. 11. As a result, the signal potential Vsig is added to the threshold voltage Vth, and the added result is written in the storage capacitor 93 as well as a voltage for mobility correction ΔVμ is subtracted and the subtraction result is written in the storage capacitor 93. That is, Vsig+Vtg−ΔVμ is written in the storage capacitor 93. The source potential Vs of the drive transistor 92 is increased to −3V+ΔVμ.

A period after the time period t12 corresponds to a light emission period T12 in which the light emitting element 94 emits light. The time point $t_{12}$ is the time point indicating the timing before the video signal line potential is switched to the extinction potential Vers. In the time point $t_{12}$, the WS driver 82 switches the scanning line potential WS to the low potential to turn off the sampling transistor 91. According to this, the gate G of the drive transistor 92 becomes in the floating state. Then, the bootstrap operation is performed and the gate potential Vg and the source potential Vs of the drive transistor 92 are increased while the voltage (Vsig+Vth−ΔVμ) written in the storage capacitor 93 is maintained.

Operation of the pixel 31 in the light emission period T12 for details will be as follows. That is, the drive transistor 92 supplies a fixed drive current Ids' corresponding to the voltage (Vsig+Vth−ΔVμ) written in the storage capacitor 93 to the light emitting element 94. A value Vel of the anode potential (referred to as an anode potential in the following description) of the light emitting element 94 is increased to a voltage Vx at which the drive current Ids' flows in the light emitting element 94 and the state of the light emitting element 94 moves to the light emitting state.

As described above, since one DS driver 81 is used by plural power supply line DSL in common in the unit scanning drive method, it is difficult to perform control concerning light emission and light extinction (referred to as a duty control in the following description) by using the power supply line potential DS. Therefore, the duty control is performed by using the scanning line potential WS in the unit scanning drive method.

<Operation Example of Pixels 31 of Respective Rows in the Basic Unit Scanning Drive Method>

The operation example of one pixel 31 in the basic unit, scanning drive method has been explained.

Next, the relation of operation examples of pixels 31 of respective rows in the basic unit scanning drive method will be explained.

Figure 12:
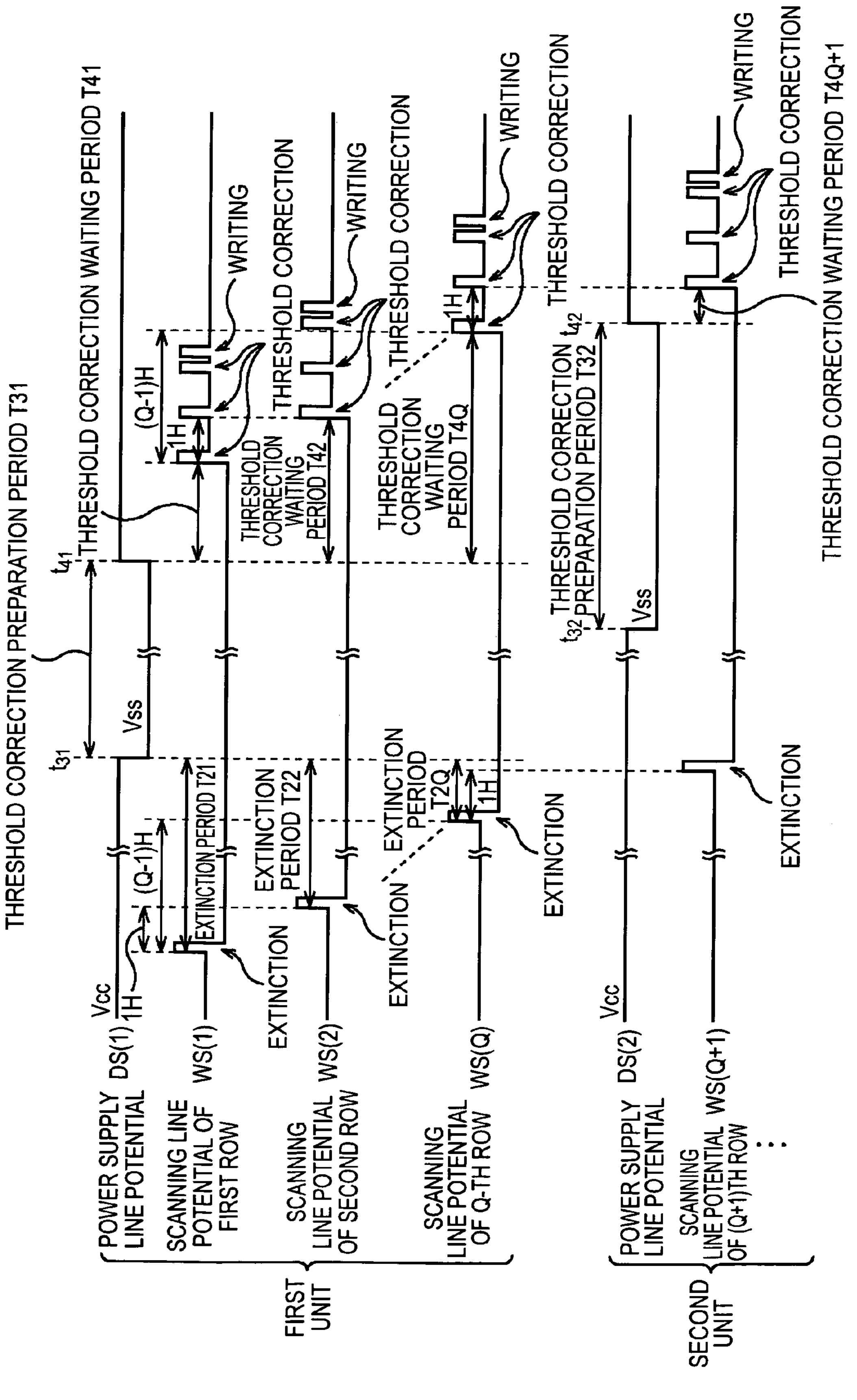
FIG. 12 is a timing chart explaining the operation example of the pixel in FIG. 3.

FIG. 12 is a timing chart explaining the relation of operation examples of pixels 31 of respective rows in the basic unit scanning drive method.

FIG. 12 shows variations of the power supply potential DS and the scanning line potentials WS of respective rows concerning the first unit and the second unit.

The potential DS which is common to the power supply lines DSL in the R-th unit is referred to as a power supply line DS (R) in the following description. The potential WS of a scanning line WSL-P which is the P-th scanning line (P is any of integers of 1 to N) counted from the top in the organic EL panel 61 of FIG. 3 is referred to as a scanning line potential WS(P) in the following description.

In the example of FIG. 12, a period from a time point $t_{31}$ to a time point $t_{41}$ corresponds to a threshold correction preparation period T31. Therefore, the DS driver 81-1 of the first unit switches a power supply line potential DS(1) from the high potential Vcc to the low potential Vss at the time point $t_{31}$. At a time point $t_{41}$, the DS driver 81-1 in the first unit switches the power supply line potential DS(1) to the high potential Vcc.

In the example of FIG. 12, a period from a time point $t_{32}$ to a time point $t_{42}$ corresponds to a threshold correction preparation period T32. Therefore, a DS driver 81-2 of the second unit switches a power supply line potential DS (2) from the high potential Vcc to the low potential Vss at the time point $t_{32}$. In the time point $t_{42}$, the second unit DS driver 81-2 switches the power supply line potential DS(2) to the high potential Vcc.

As shown in FIG. 12, the common power supply line potential DS(1) is given to the power supply line DSL-1 of the first row to the power supply line DSL-Q of the Q-th row by one DS driver 81-1 in the first unit. Therefore, the threshold correction preparation period T31 will be the period common to the first row to the Q-th row.

On the other hand, scanning line potentials WS(1) to WS(Q) are respectively given to scanning line WSL-1 of the first row to the scanning line WSL-Q of the Q-th row by respective WS drivers 82-1 to 82-Q. That is, the gate driver 71 drives the WS drivers 82-1 to 82-Q sequentially to thereby scan the pixels 31 row by row while switching the scanning line potential WS(1) of the first row to the scanning line potential WS(Q) of the Q-th row in the horizontal period (1H).

Therefore, respective extinction periods T21 to T2Q of the first to the Q-th row are becoming shorter 1H by 1H from the first row toward lower rows in the first unit. This is the same in the second to the (K+1)th units. In this example, the extinction in the first row of the second unit (the (Q+1)th row in all units) is started after 1H has passed from the start of extinction in the Q-th row of the first unit.

Respective threshold correction waiting periods T41 to T4Q of the first to the Q-th row are becoming shorter 1H by 1H from the first row to toward lower rows in the first unit. This is the same in the second to the (K+1)th units. In this example, the threshold correction in the first row of the second unit (the (Q+1)th row in all units) is started after 1H has passed from the start of threshold correction in the Q-th row of the first unit.

In FIG. 12, periods written as "threshold correction" indicate threshold corrections T5, T7 and T9 in FIG. 5 with respect to respective rows. Periods written as "writing" indicate the writing+mobility correction period T11 in FIG. 5 with respect to each row.

In the organic EL panel 61 applying the basic unit scanning drive method which is operated as the above, "cathode fluctuation streaks" are occasionally seen, which reduce display quality. Therefore, the present inventor has invented a method of suppressing "cathode fluctuation streaks" to maintain the display quality. Hereinafter, the method will be explained after "cathode fluctuation streaks" is explained.

<Explanation of "Cathode Fluctuation Streaks">

As described above, in the basic unit scanning drive method, the potential DS of all plural power supply lines DSL included in the unit is switched at the same timing from one of the high potential Vcc and the low potential Vss to the other thereof. Therefore, for example, when the potential is switched from the high potential Vcc to the low potential Vss, that is, at the falling edge of the power supply line potential DS, potential fluctuation of the power supply line potential DS enters the cathode of the light emitting element 94 by the DS coupling of one unit in which the DS driver is used in common. This causes fluctuation in the cathode potential Vcath. The DS coupling means a coupling by parasitic capacitance generated between the power supply line DSL and the cathode of the light emitting element 94.

Figure 13B:
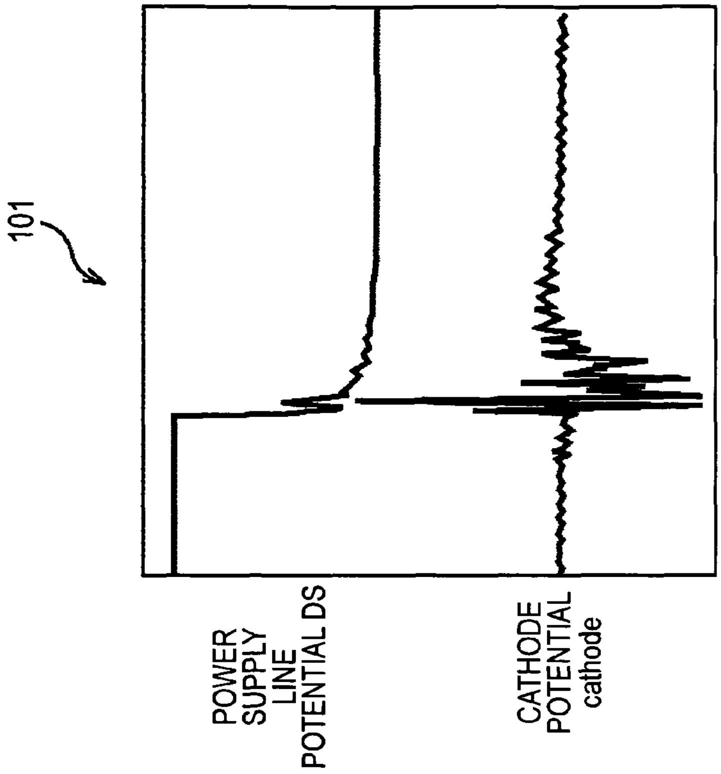
FIG. 13A and FIG. 13B are views for explaining the operation example of the pixel in FIG. 3.
Figure 13A:
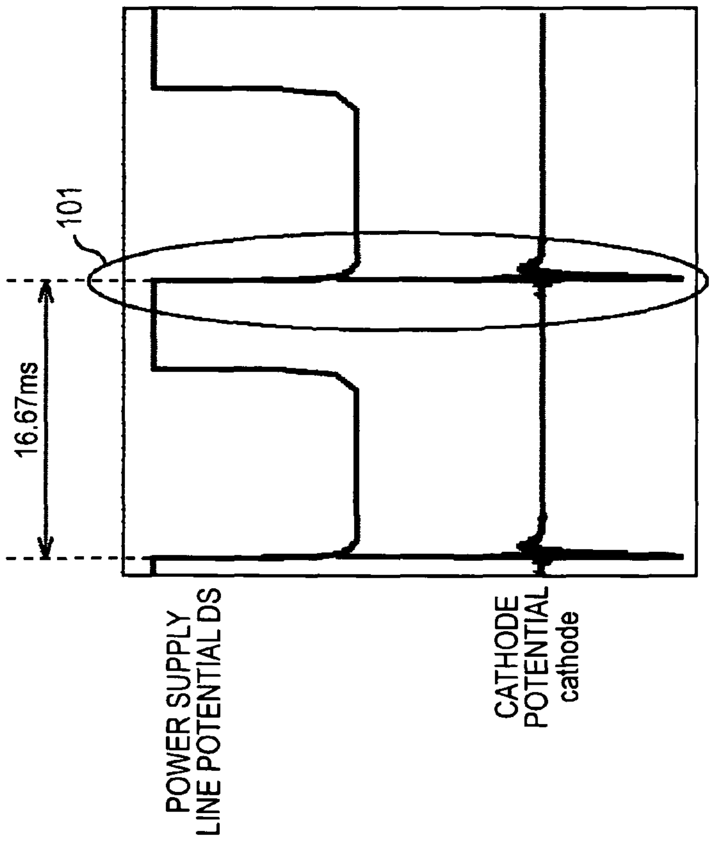

FIG. 13A and FIG. 13B are timing charts showing fluctuation of the cathode potential Vcath at the falling edge of the power supply line potential DS.

The timing chart of FIG. 13A shows the timing when the power supply potential DS is repeatedly switched from the high potential Vcc to the low potential Vss in a cycle of 16.67 ms.

FIG. 13B is an enlarged view of a period 101 in the vicinity of the timing at the second switching in the timing chart of FIG. 13A, that is, the period 101 in the vicinity of the falling edge of the power supply line potential DS.

The cycle of 16.67 ms in FIG. 13A means a period corresponding to the one frame period (1F).

As shown in FIG. 13B, fluctuation at the falling edge of the power supply line potential DS appears as fluctuation of the cathode potential Vcath by the DS coupling.

When the threshold correction or the mobility correction is performed while the fluctuation of the cathode potential Vath occurs, in other words, the fluctuation of the cathode Vcath occurs during the period from the threshold correction period T5 to the writing+mobility correction period T11 in FIG. 5, the gate-source voltage Vgs is changed and the threshold correction and the mobility correction may not be performed correctly. As a result, light emission luminance in the pixels 31 varies and band-shaped streaks are seen in respective units in the horizontal direction of the screen of the organic EL panel 61 in the light emitting state, which reduces display quality.

As described above, band-shaped streaks in respective units are generated due to the fluctuation of the cathode potential Vcath. Accordingly, the band-shaped streaks are called "cathode fluctuation streaks" in the present specification.

Figure 14:
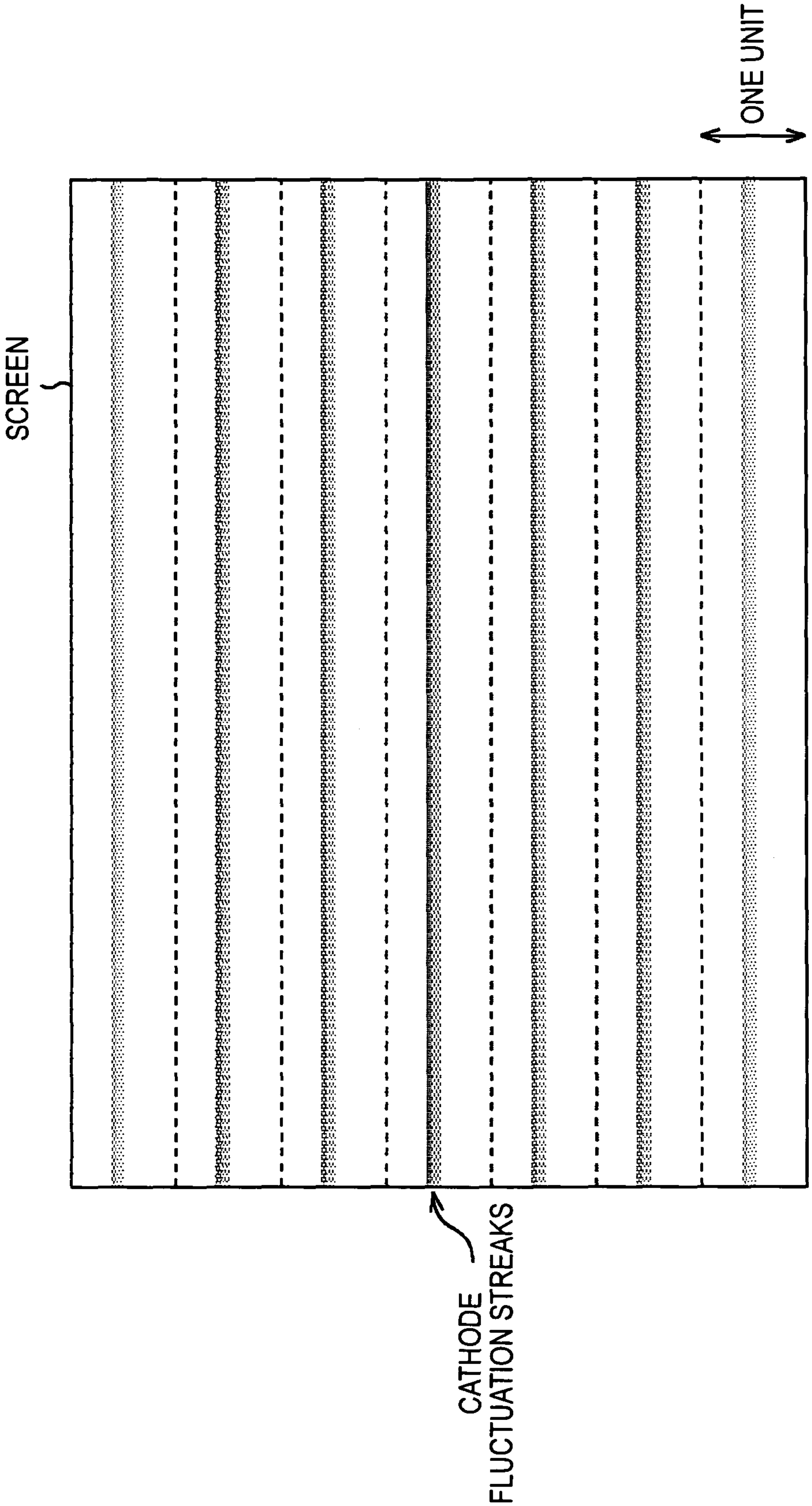
FIG. 14 is a view showing a display example of a screen of the organic EL panel of FIG. 3.

FIG. 14 is a view showing a display example of a screen of the organic EL panel 61 in which "cathode fluctuation streaks" occur. In the example of FIG. 14, the number of power supply lines DSL belonging to each unit is the same number.

The shading in the screen of FIG. 14 shows the gradation of light emission luminance. That is, in the screen shown in FIG. 14, light emission luminance is increased as the shading becomes lighter (close to white). On the other hand, light emission luminance is reduced as the shading becomes darker (close to black). In the screen of FIG. 14, dotted lines represent borders between units. That is, a portion between two dotted lines represents one unit.

Dark band-shaped streaks displayed in the horizontal direction of respective units in the screen of FIG. 14 are examples of "cathode fluctuation streaks".

As shown in FIG. 14, "cathode fluctuation streaks" in respective units are seen to be darkest (darkest in luminance) in the unit at the center of the screen and seen to be lighter gradually toward the vertical upper direction or the lower direction (brighter in luminance).

As explained above, "cathode fluctuation streaks" are generated when fluctuation of the cathode potential Vcath occurs during the period from the threshold correction period T5 to the writing+mobility correction period T11 in FIG. 5, more exactly, during the threshold correction and the mobility correction in the period are performed. The fluctuation of the cathode potential Vcath occurs at the timing of the falling edge of the power supply line potential DS. In short, as shown in FIG. 15, the "cathode fluctuation streak" in the s-th unit ("s" is any of values of 1 to a value of the total number of units) occurs in the manner as described below.

In related art, the power supply line potential DS(n) of the n-th unit ("n" is a value of 1 to the value of the total number of units) falls during the period from the threshold correction period T5 to the writing+mobility correction period T11 concerning any of rows (for example, m-row) in the s-th unit. Accordingly, in the case that the threshold correction or the mobility correction is performed when the power supply line potential DS (n) falls, "cathode fluctuation streak" of the s-th unit occurs.

Figure 15:
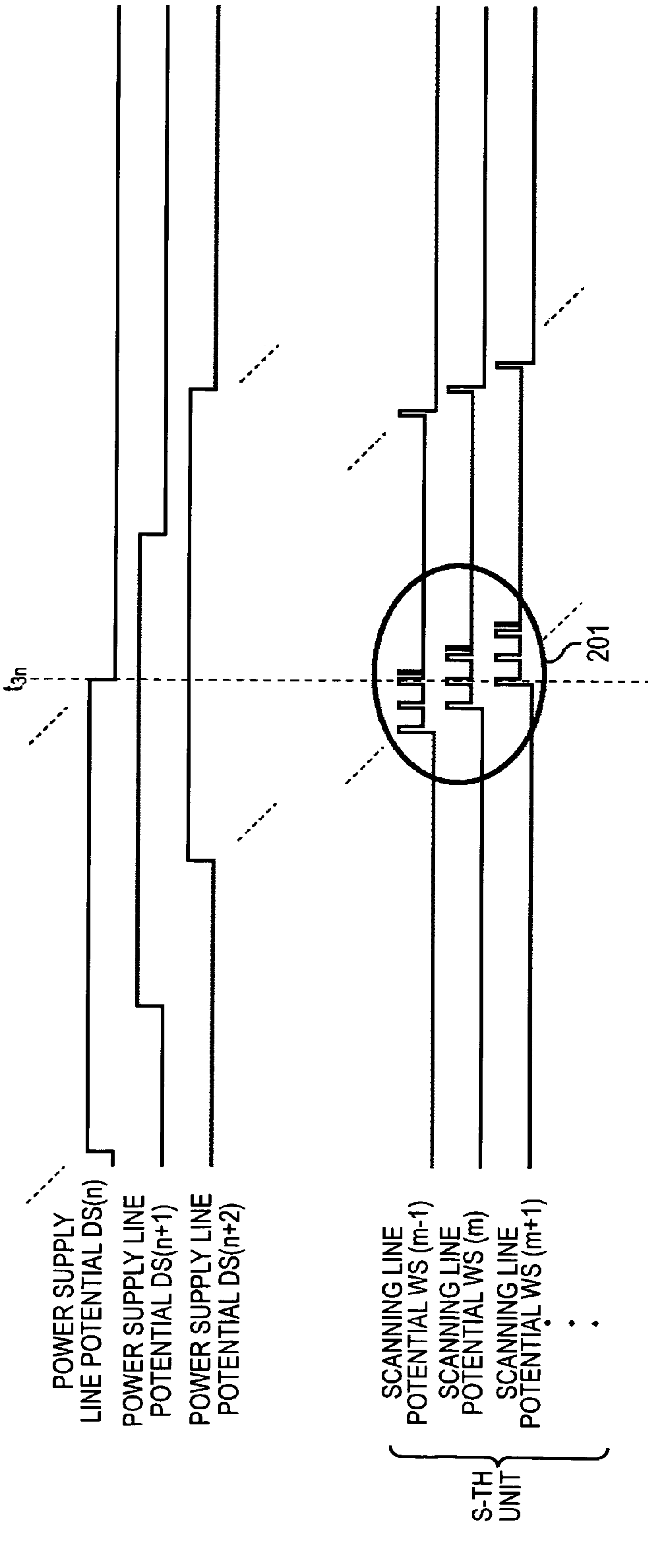
FIG. 15 is a chart showing part of the timing chart of FIG. 5.

FIG. 15 shows a timing chart of power supply line potentials DS(n) to DS(n+2) of the n-th to the (n+2)th unit and the scanning line potentials WS(m−1) to WS(m+1) of the (m−1) th to the (m+1)th unit in the timing chart of FIG. 5.

Figure 16:
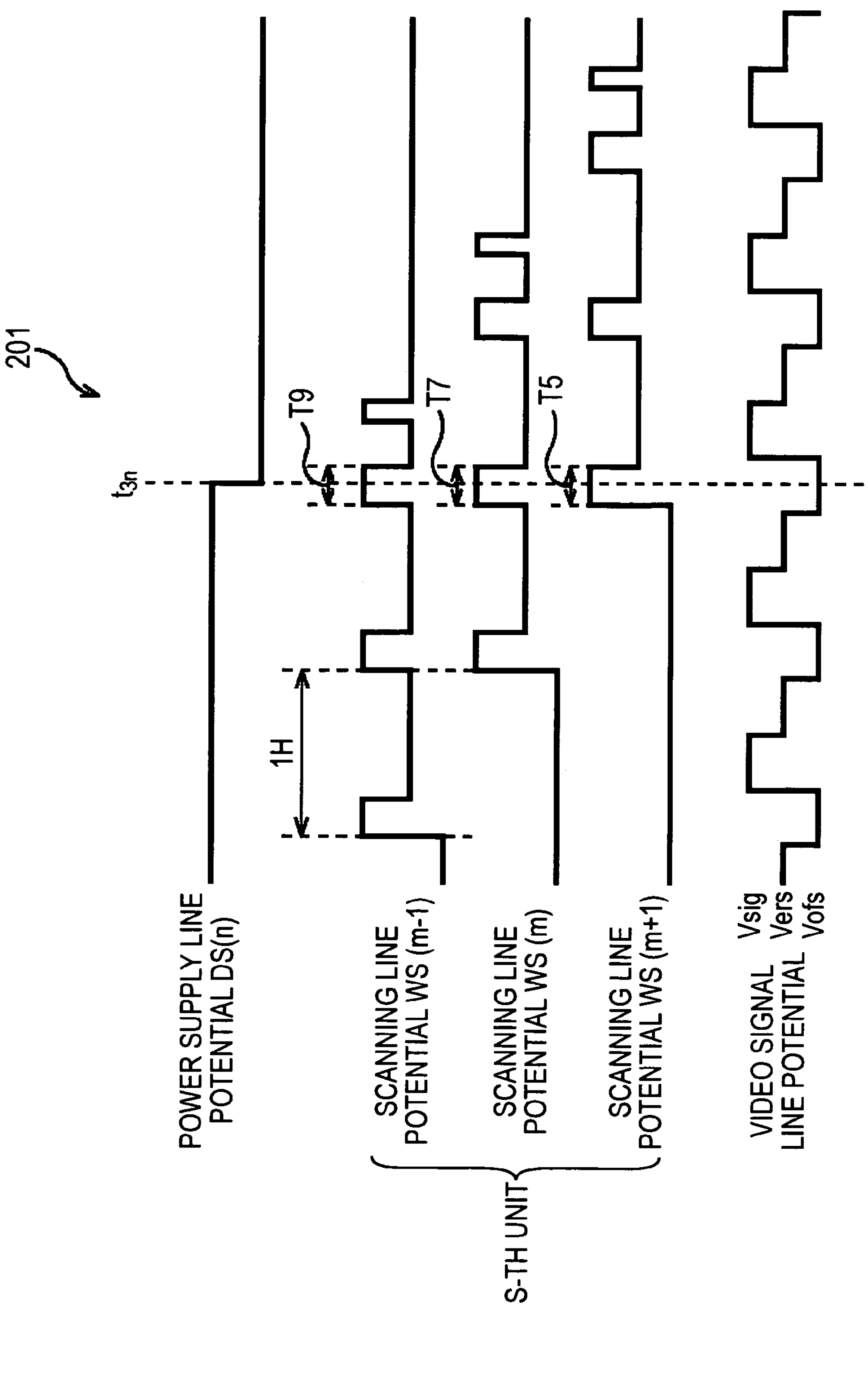
FIG. 16 is an enlarged view of part of the timing chart of FIG. 15.

FIG. 16 is an enlarged view of a timing 201 in the vicinity of the falling edge of the power supply line potential DS(n) in the n-th unit in the timing chart of FIG. 15. FIG. 16 also shows a timing chart of the signal line potential.

As shown in FIG. 15, the DS driver 81-*n* in the n-th unit switches the power supply line potential DS(n) to the low potential Vss at a time point $t_{an}$. That is, the time point $t_{an}$ is a time point indicating the timing of the falling edge of the power supply line potential DS(n) in the n-th unit.

As shown in FIG. 16, the time point $t_{3n}$ indicating the timing of the falling edge of the power supply line potential DS(n) in the n-th unit is a time point in the threshold correction period T9 of the (m−1)th row, the threshold correction period T7 of the m-th row and the threshold correction period T5 of the (m+1)th row among the s-th unit. Therefore, fluctuation of the cathode potential Vcath by the falling of the power supply line potential DS(n) in the n-th unit occurs during the threshold correction or the mobility correction is performed in the m-th row or the (m+1)th row in the s-th unit, as a result, "cathode fluctuation streak" in the s-th unit occurs.

The present inventor has invented the following method to suppress the occurrence of "cathode fluctuation streaks". That is, the inventor has invented a method of prohibiting the switching operation of the power supply line potential to the low potential Vss in all units during the period of the threshold correction or the mobility correction in the organic EL panel 61. Hereinafter, the method is referred to as a method of prohibiting power supply line potential falling.

Figure 17:
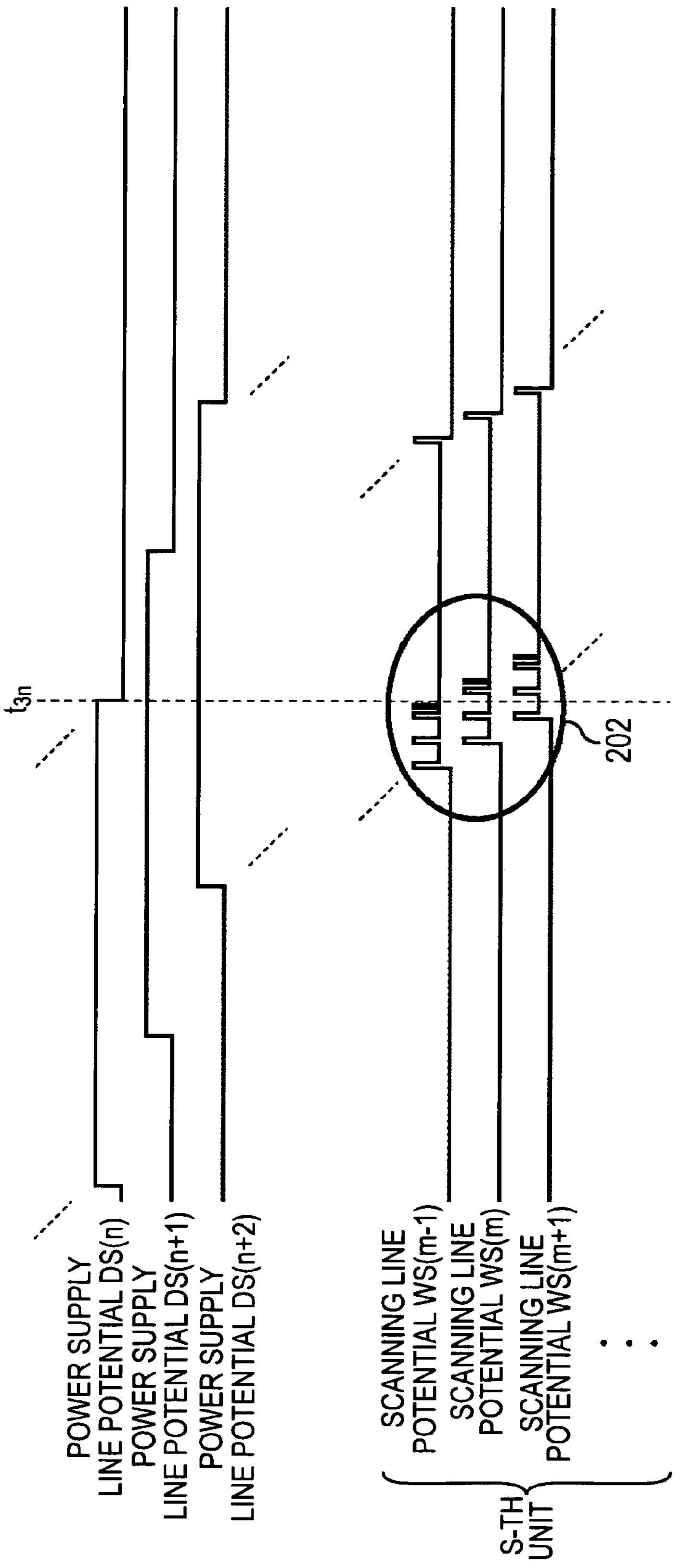
FIG. 17 is a timing chart explaining a specific method for realizing a method of prohibiting power supply line potential falling.

FIG. 17 is a view explaining a specific method for realizing the method of prohibiting power supply line potential falling.

FIG. 17 shows a timing chart of the power supply line potentials DS(n) to DS(n+2) in the n-th to the (n+2) th units and the scanning line potentials WS(m−1) to WS(m+1) in the (m−1) th to the (m+1)th units when the method of prohibiting power supply line potential falling is applied.

Figure 18:
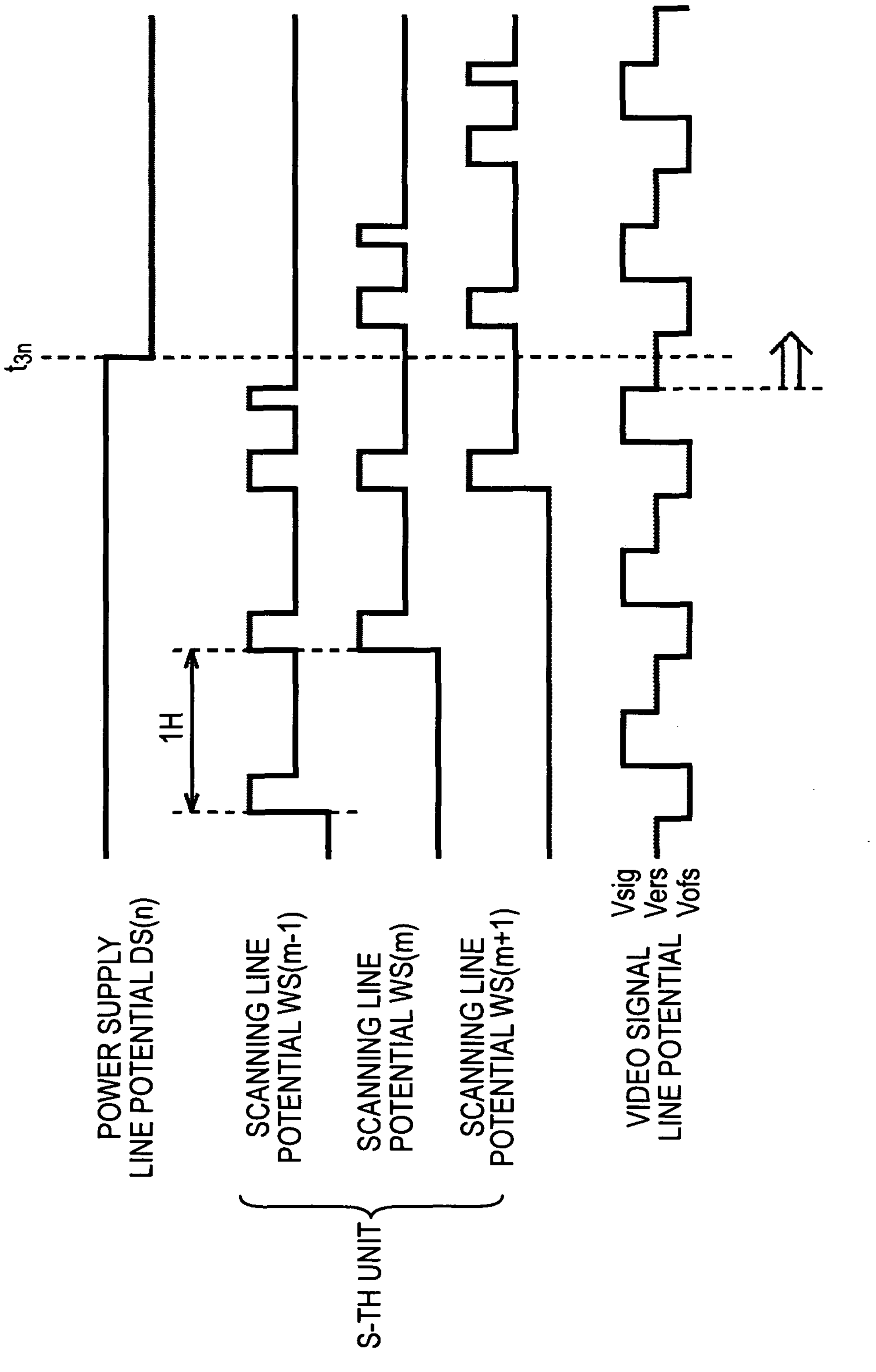
FIG. 18 is an enlarged view of part of the timing chart of FIG. 17.

FIG. 18 is an enlarged view of a timing 202 in the vicinity of the falling edge of the power supply line potential DS (N/Q) in the first unit (first-stage unit) the timing chart of FIG. 17. FIG. 18 also shows a timing chart of the signal line potential.

When the method of prohibiting power supply line potential falling is applied, the time point $t_{3n}$ which is the timing at which the power supply line potential DS (n) by the DS driver 81-*n* in the n-th unit is switched to the lower potential Vss are as shown in FIG. 17 and FIG. 18. That is, the power supply line potential DS (n) in the n-th unit falls so as not to correspond to any of the threshold correction periods T5, T7, T9 and the writing+mobility correction period T11.

Specifically, the time point $t_{3n}$ which is the falling timing of the power supply line potential DS(n) in the n-th unit can be adjusted as follows.

That is, the video signal line potential is switched from the reference potential Vofs to the signal potential Vsig in the writing+mobility correction preparation period T10 and the signal line Vsig is maintained during the writing+mobility correction period T11 as described above. After that, in the light emitting period T12, the video signal line potential is switched to the extinction potential Vers. That is, the video signal lint potential is switched in the order of the reference potential Vofs, the signal potential Vsig and the intermediate potential Vers. Accordingly, the time point $t_{3n}$ which is the falling timing of the power supply line potential DS (n) in the n-th unit is preferably adjusted so as to be just after the video signal line potential has been switched from the signal potential Vsig to the extinction potential Vers.

In other words, the period in which the fluctuation of the cathode potential Vcath most likely to occur is the writing+mobility correction preparation period T10. Additionally, periods in which the fluctuation of the cathode potential Vcath likely to occur next to the period T10 are threshold correction periods T5, T7 and T9. Therefore, the time point $t_{3n}$ which is the falling timing of the power supply line potential DS(n) in the n-th unit will be optimum at a time point most distant from the next writing+mobility correction preparation period T10 as well as a time point also most distant from the next threshold correction periods T5, T7 and T9. The timing just after the video signal line potential has been switched from the signal potential Vsig to the extinction potential Vers is preferable.

It is preferable to make an adjustment so that the time point $t_{3n}$ which is the falling timing of the power supply line potential DS (n) in the n-th unit comes within a period at least just after the video signal line potential has been switched from the signal potential Vsig to the extinction potential Vers before the video signal line potential is switched from the extinction potential Vers to the reference potential Vofs.

Accordingly, effects of fluctuation of the cathode potential Vcath with respect to the mobility correction and the threshold correction can be suppressed to the minimum. As a result, "cathode fluctuation streaks" can be suppressed and the display quality can be maintained.

It is desirable that there is no effect of the fluctuation in the cathode potential Vcath also at the extinction period of the light emitting element 94. In order to reduce the effect, it is preferable to perform the extinction operation plural times.

In the above example, as stages of the video signal line potential, three stages of the reference potential Vofs, the signal potential Vsig and the intermediate potential Vers are applied. However, it is not necessary that stages of the video signal line potential are three stages. For example, the intermediate potential Vers is made to be the same as the reference potential Vofs, thereby allowing stages of the video signal line potential to be two stages as the result.

The organic EL panel 61 explained as the above is also referred to as a panel module. A power supply circuit, an image LSI (Large Scale Integration) and the like are further added to the panel module to form a display device.

The display device using the organic EL panel can be applied to displays of various electronic apparatuses. As electronic apparatuses, for example, there are a digital still camera, a digital video camera, a notebook personal computer, a cellular phone, a television receiver and the like. That is, the invention can be applied to displays of electronic apparatuses of various fields which display video signals inputted to these electronic apparatuses or generated in these electronic apparatuses as images or video. Hereinafter, examples of electronic apparatuses to which such display device is applied will be shown.

For example, the invention can be applied to the television receiver as an example of electronic apparatuses. The television receiver includes a video display screen having a front panel, a filter glass and the like, which is manufactured by using the display device according to an embodiment of the invention as the video display screen thereof.

For example, the invention can be applied to the digital still camera as an example of electronic apparatuses. The digital still camera includes an imaging lens, a display unit, a control switch, a menu switch, a shutter and the like, which is manufactured by using the display device according to an embodiment of the invention as the display unit thereof.

For example, the invention can be applied to the notebook personal computer as an example of electronic apparatuses. In the notebook personal computer, a main body thereof includes a keyboard operated at the time of inputting characters and the like as well as a main body cover includes a display unit on which images are displayed. The notebook personal computer is manufactured by using the display device according to an embodiment of the invention as the display unit thereof.

For example, the invention can be applied to a portable terminal device as an example of electronic apparatuses. The portable terminal device includes an upper casing and a lower casing. As states of the portable terminal devices, there are a state in which these two casings are opened or a state in which these are closed. The portable terminal device includes a connection portion (a hinge portion in this case), a display, a sub-display, a picture light, a camera and the like in addition to the above upper casing and the lower casing, which is manufactured by using the display device according to an embodiment of the invention as the display or the sub-display thereof.

For example, the invention can be applied to a digital video camera as an example of electronic apparatuses. The digital video camera includes a body portion, a lens for imaging subjects at a side surface facing the front, a start/stop switch at the time of imaging, a monitor and the like, which is manufactured by using the display device according to an embodiment of the invention as the monitor thereof.

The embodiment of the invention is not limited to the above-described embodiment, and can be variously modified within a scope not departing from the gist of the invention.

The present application contains subject matter related to that disclosed in Japanese Priority Patent Application JP 2009-084184 filed in the Japan Patent Office on Mar. 31, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A panel comprising:

pixels arranged in a matrix state, each including:

a light emitting element that emits light the intensity of which corresponds to the magnitude of a drive current, a sampling transistor configured to sample a video signal, a storage capacitor configured to store a potential of the video signal sampled by the sampling transistor, and a drive transistor configured to supply the drive current to the light emitting element, the magnitude of the drive current corresponding to the potential of the video signal stored in the storage capacitor;

power supply lines, each respective power supply line corresponding to a different row of the pixels and being configured to propagate power supply signals to pixels of the row to which the respective power supply line corresponds;

scanning lines, each respective scanning line corresponding to a different row of the pixels and being configured to propagate scanning control signals to pixels of the row to which the respective scanning line corresponds;

a power supply control circuit configured to selectively switch potentials of the power supply signals propagated on the power supply lines between a high power supply potential and a low power supply potential, wherein the power supply lines are grouped into units that each comprise n≥2 different ones of the power supply lines such that the potentials of the power supply signals that are propagated on those of the power supply lines that are grouped into a same unit correspond to each other and the power supply control circuit is configured to switch the potentials of the power supply signals that are propagated on those of the power supply lines that are grouped into a same unit between the high power supply potential and the low power supply potential at same timings;

a scanning control circuit configured to switch a potential of the scanning control signal between a high scanning potential and a low scanning potential, wherein conduction of the sampling transistor of each of the respective pixels is controlled by the switching of the potential of the scanning control signal propagated on the scanning line corresponding to the row of the respective pixel; and a data circuit configured to repeatedly switch the potential of the video signal during horizontal scanning periods, wherein:

each of the horizontal scanning periods of a given frame period comprises a signal sub-period, an extinction sub-period, and an offset sub-period, successively occurring in that order, the data circuit is configured to:

apply a signal potential as the potential of the video signal during each signal sub-period, the signal potential corresponding to a gradation value of an image to be displayed, apply an extinction potential as the potential of the video signal during each extinction sub-period, the extinction potential corresponding to a potential that, if applied to a gate electrode of the drive transistor of a given one of the pixels while the light emitting element of the given one of the pixels is emitting light, will cause the light emitting element of the given one of the pixels to stop emitting light, and apply a reference potential as the potential of the video signal during each offset sub-period, the power supply control circuit is configured to switch the potentials of the power supply signals from the high power supply potential to the low power supply potential only during extinction sub-periods, and the extinction potential is greater than the reference potential.

2. The panel according to claim 1, wherein each of the power supply lines of a given unit are directly electrically connected to the other power supply lines of the given unit such that when a power supply signal is applied to one of the power supply lines of the given unit the same power supply signal is applied simultaneously to each of the other power supply lines of the given unit.

3. The panel according to claim 1, wherein the power supply control circuit and the scanning control circuit are configured to perform, during a given frame period, threshold correction for a given one of the pixel circuits during a threshold correction period, the threshold correction comprising causing a threshold voltage of the drive transistor of the given one of the pixel circuits to be stored in the storage capacitor of the given one of the pixel circuits prior to storing the potential of the video signal in the storage capacitor of the given one of the pixel circuits during the given frame period, and wherein the threshold correction period occurs during the offset sub-period of at least one of the horizontal scanning periods.

4. The panel according to claim 1, wherein the scanning control circuit is configured to end light emission of a given one of the pixel circuits for a given frame period during the extinction sub-period of one of the horizontal scanning periods by switching the potential of the scanning control signal from the low scanning potential to the high scanning potential.

5. The panel according to claim 1, wherein the power supply circuit and the scanning control circuit are configured to, during a given frame period:

end light emission of a given one of the pixel circuits by switching the potential of the scanning control signal from the low scanning potential to the high scanning potential during the extinction sub-period of one of the horizontal scanning periods, wherein light emission is ended for the given one of the pixel circuits prior to switching the potentials of the power supply signals at the end of the given frame period from the high power supply potential to the low power supply for those of the power supply lines that are grouped into the unit that includes the power supply line that is connected to the given pixel, perform threshold correction for the given one of the pixel circuits subsequent to switching the potentials of the power supply signals during the given frame period from the low power supply potential to the high power supply for those of the power supply lines that are grouped into the unit that includes the power supply line that is connected to the given pixel, the threshold correction comprising causing a threshold voltage of the drive transistor of the given one of the pixel circuits to be stored in the storage capacitor of the given one of the pixel circuits prior to storing the potential of the video signal in the storage capacitor of the given one of the pixel circuits during the given frame period, wherein each threshold correction period occurs during the offset sub-period of at least one of the horizontal scanning periods.

6. An electronic apparatus comprising the panel of claim 1.

7. The panel according to claim 1, wherein each unit of power supply lines has a different power supply driver corresponding thereto, and wherein each of the power supply lines is connected to the power supply driver that corresponds to the unit of power supply lines in which the respective power supply line is grouped.

8. A method of controlling a panel, wherein the panel comprises pixels arranged in a matrix state, each including: a light emitting element that emits light the intensity of which corresponds to the magnitude of a drive current, a sampling transistor configured to sample a video signal, a storage capacitor configured to store a potential of the video signal sampled by the sampling transistor, and a drive transistor configured to supply the drive current to the light emitting element, the magnitude of the drive current corresponding to the potential of the video signal stored in the storage capacitor; power supply lines, each respective power supply line corresponding to a different row of the pixels and being configured to propagate power supply signals to pixels of the row to which the respective power supply line corresponds; scanning lines, each respective scanning line corresponding to a different row of the pixels and being configured to propagate scanning control signals to pixels of the row to which the respective scanning line corresponds; a power supply control circuit configured to selectively switch potentials of the power supply signals propagated on the power supply lines between a high power supply potential and a low power supply potential, wherein the power supply lines are grouped into units that each comprise n≥2 different ones of the power supply lines such that the potentials of the power supply signals that are propagated on those of the power supply lines that are grouped into a same unit correspond to each other; a scanning control circuit configured to switch a potential of the scanning control signal between a high scanning potential and a low scanning potential, wherein conduction of the sampling transistor of each of the respective pixels is controlled by the switching of the potential of the scanning control signal propagated on the scanning line corresponding to the row of the respective pixel; and a data circuit configured to switch the potential of the video signal during horizontal scanning periods, wherein each of the horizontal scanning periods of a given frame period comprises a signal sub-period, an extinction sub-period, and an offset sub-period, successively occurring in that order, the method comprising:

applying a signal potential as the potential of the video signal during each signal sub-period, the signal potential corresponding to a gradation value of an image to be displayed, applying an extinction potential as the potential of the video signal during each extinction sub-period, the extinction potential corresponding to a potential that, if applied to a gate electrode of the drive transistor of one of the pixels, would cause the drive transistor to stop supplying the drive current, and applying a reference potential as the potential of the video signal during each offset sub-period;

switching the potentials of the power supply signals that are propagated on those of the power supply lines that are grouped into a same unit between the high power supply potential and the low power supply potential at same timings; and switching the potentials of the power supply signals from the high power supply potential to the low power supply potential only during extinction sub-periods, wherein the extinction potential is greater than the reference potential.

9. The method according to claim 8, wherein each of the power supply lines of a given unit are directly electrically connected to the other power supply lines of the given unit such that when a power supply signal is applied to one of the power supply lines of the given unit the same power supply signal is applied simultaneously to each of the other power supply lines of the given unit.

10. The method according to claim 8, further comprising:

performing, during a given frame period, threshold correction for a given one of the pixel circuits during a threshold correction period, the threshold correction comprising causing a threshold voltage of the drive transistor of the given one of the pixel circuits to be stored in the storage capacitor of the given one of the pixel circuits prior to storing the potential of the video signal in the storage capacitor of the given one of the pixel circuits during the given frame period, and wherein the threshold correction period occurs during the offset sub-period of at least one of the horizontal scanning periods.

11. The method according to claim 8, further comprising:

ending light emission of a given one of the pixel circuits for a given frame period during the extinction sub-period of one of the horizontal scanning periods by switching the potential of the scanning control signal from the low scanning potential to the high scanning potential.

12. The method according to claim 8, further comprising, during a given frame period:

ending light emission of a given one of the pixel circuits by switching the potential of the scanning control signal from the low scanning potential to the high scanning potential during the extinction sub-period of one of the horizontal scanning periods, wherein light emission is ended for the given one of the pixel circuits prior to switching the potentials of the power supply signals at the end of the given frame period from the high power supply potential to the low power supply for those of the power supply lines that are grouped into the unit that includes the power supply line that is connected to the given pixel, performing threshold correction for the given one of the pixel circuits subsequent to switching the potentials of the power supply signals during the given frame period from the low power supply potential to the high power supply for those of the power supply lines that are grouped into the unit that includes the power supply line that is connected to the given pixel, the threshold correction comprising causing a threshold voltage of the drive transistor of the given one of the pixel circuits to be stored in the storage capacitor of the given one of the pixel circuits prior to storing the potential of the video signal in the storage capacitor of the given one of the pixel circuits during the given frame period, wherein each threshold correction period occurs during the offset sub-period of at least one of the horizontal scanning periods.

* * * * *